US012628042B2

(12) United States Patent
Namba et al.

(10) Patent No.: US 12,628,042 B2
(45) Date of Patent: May 12, 2026

(54) RADIO COMMUNICATION APPARATUS AND RADIO COMMUNICATION METHOD FOR LOW LATENCY COMMUNICATIONS

(71) Applicant: SHARP KABUSHIKI KAISHA, Sakai City (JP)

(72) Inventors: Hideo Namba, Sakai City (JP); Atsushi Shirakawa, Sakai City (JP); Hiromichi Tomeba, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 265 days.

(21) Appl. No.: 18/039,291

(22) PCT Filed: Nov. 26, 2021

(86) PCT No.: PCT/JP2021/043301
§ 371 (c)(1),
(2) Date: May 30, 2023

(87) PCT Pub. No.: WO2022/118741
PCT Pub. Date: Jun. 9, 2022

(65) Prior Publication Data
US 2023/0422097 A1     Dec. 28, 2023

(30) Foreign Application Priority Data

Dec. 1, 2020    (JP) ................................. 2020-199373

(51) Int. Cl.
*H04W 28/08* (2023.01)
*H04W 48/18* (2009.01)
(Continued)

(52) U.S. Cl.
CPC ....... *H04W 28/0975* (2020.05); *H04W 48/18* (2013.01); *H04W 72/0453* (2013.01); *H04W 76/15* (2018.02)

(58) Field of Classification Search
CPC ............. H04W 28/0975; H04W 76/15; H04W 48/18; H04W 72/0453; H04W 24/10;
(Continued)

(56) References Cited

U.S. PATENT DOCUMENTS

2013/0077554 A1*  3/2013  Gauvreau ............... H04L 5/001
                                                              370/312
2014/0079016 A1    3/2014  Dai et al.
(Continued)

FOREIGN PATENT DOCUMENTS

JP        2014-502453 A     1/2014
JP        2014-529276 A    10/2014
JP        2019-514289 A     5/2019

OTHER PUBLICATIONS

WO_2021071088_A1 (Year: 2021).*
(Continued)

*Primary Examiner* — Rushil P. Sampat
(74) *Attorney, Agent, or Firm* — ScienBiziP, P.C.

(57) ABSTRACT

A radio communication apparatus that simultaneously uses multiple radio channels, the radio communication apparatus includes a radio communicator, and a radio controller, wherein the radio controller uses multiple transmission methods, at least one of the multiple transmission methods is a method for reducing latency, at least one radio channel of the multiple radio channels is allocated to the method for reducing latency, a beacon is transmitted on the multiple radio channels by use of the radio communicator, and information transmitted in the beacon includes an information element indicating the at least one radio channel allocated to the method for reducing latency.

5 Claims, 13 Drawing Sheets

(51) Int. Cl.
  *H04W 72/0453* (2023.01)
  *H04W 76/15* (2018.01)

(58) Field of Classification Search
  CPC ............. H04W 28/0278; H04W 28/02; H04W
          72/048; H04W 72/21; H04W 72/51;
          H04W 72/543; H04W 84/12; H04L 1/00
  See application file for complete search history.

(56) References Cited

U.S. PATENT DOCUMENTS

| | | | |
|---|---|---|---|
| 2017/0303245 A1 | 10/2017 | Asterjadhi et al. | |
| 2022/0369403 A1* | 11/2022 | Fang ..................... | H04W 76/15 |
| 2022/0377588 A1* | 11/2022 | Kim ..................... | H04W 84/12 |
| 2023/0022414 A1* | 1/2023 | Kim ..................... | H04L 1/1896 |
| 2023/0147636 A1* | 5/2023 | Kim ................. | H04W 52/0229 |
| | | | 370/318 |

OTHER PUBLICATIONS

Rui Cao et al., "Aggregated PPDU for Large BW", doc.: IEEE 802.11-20/0693r1, Date: May 2, 2020.
Dave Cavalcanti et al., "Low latency service in 802.11be", doc.: IEEE 802.11-20/0418r0, Mar. 2020.

* cited by examiner

IEEE 802.11a/b/g

| L-STF | L-LTF | L-SIG | Data |
|-------|-------|-------|------|

IEEE 802.11n

| L-STF | L-LTF | L-SIG | HT-SIG | HT-STF | HT-LTF | Data |
|-------|-------|-------|--------|--------|--------|------|

IEEE 802.11ac

| L-STF | L-LTF | L-SIG | VHT-SIG-A | VHT-STF | VHT-LTF | VHT-SIG-B | Data |
|-------|-------|-------|-----------|---------|---------|-----------|------|

IEEE 802.11ax

| L-STF | L-LTF | L-SIG | RL-SIG | HE-SIG-A | HE-STF | HE-LTF | HE-SIG-B | Data |
|-------|-------|-------|--------|----------|--------|--------|----------|------|

IEEE 802.11be

| L-STF | L-LTF | L-SIG | RL-SIG | U-SIG | EHT-SIG | EHT-STF | EHT-LTF | Data |
|-------|-------|-------|--------|-------|---------|---------|---------|------|

FIG. 1

| ToDS | FromDS | Address 1 | Address 2 | Address 3 | Address 4 |
|---|---|---|---|---|---|
| 0 | 0 | RA = DA | TA = SA | BSSID | N/A |
| 0 | 1 | RA = DA | TA = BSSID | SA | N/A |
| 1 | 0 | RA = BSSID | TA = SA | DA | N/A |
| 1 | 1 | RA | TA | DA | SA |

FIG. 10

RADIO COMMUNICATION APPARATUS AND RADIO COMMUNICATION METHOD FOR LOW LATENCY COMMUNICATIONS

TECHNICAL FIELD

The present invention relates to a radio communication apparatus and a radio communication method. This application claims priority based on JP 2020-199373 filed on Dec. 1, 2020, the contents of which are incorporated herein by reference.

BACKGROUND ART

The Institute of Electrical and Electronics Engineers Inc. (IEEE) has been continuously working to update the IEEE 802.11 specification that is a wireless Local Area Network (LAN) standard in order to achieve a higher speed and frequency efficiency of wireless LAN communication. In a wireless LAN, radio communication can be performed using unlicensed bands that can be used without permission (license) by nations or regions. For applications for individuals including an application for domestic use, Internet accesses from residences are wirelessly established by, for example, including wireless LAN access point functions in optical network unit for connection to a Wide Area Network (WAN) line such as the Internet or connecting wireless LAN access point apparatuses to the optical network units. In other words, wireless LAN station apparatuses such as smartphones and PCs can connect to the wireless LAN access point apparatuses to access the Internet.

The standardization of a specification of IEEE 802.11ax is expected to be completed in 2020, and wireless LAN devices compliant with the draft specification and smartphones and Personal Computers (PCs) with the wireless LAN devices equipped therein are already on the market as products compliant with Wi-Fi 6 (trade name, a name for IEEE-802.11ax compliant products certified by the Wi-Fi Alliance). Also, activities for standardizing IEEE 802.11be as a standard to succeed IEEE 802.11ax has been started. As the wireless LAN devices have been widely used, in the standardization of IEEE 802.11be, further improvement has been studied that allows throughput per user to be improved in environments where wireless LAN devices are densely installed.

Meanwhile, the European Telecommunications Standards Institute (ETSI) in Europe and the Federal Communications Commission (FCC) in the United States are studying the use of 6 GHz band (5.935 to 7.125 GHz) as an unlicensed band, and the similar study is also being performed in other countries in the world. This means that in the wireless LANs 6 GHz band is expected to be available in addition to 2.4 GHz band and 5 GHz. In order to support the expansion of frequencies to be supported, the Wi-Fi Alliance is intending to standardize Wi-Fi 6E (trade name), which is an extended version of Wi-Fi 6, to use 6 GHz band.

To be precise, 6 GHz band corresponds to frequencies of 5.935 to 7.125 GHz, and a bandwidth of about 1.2 GHz in total becomes newly available, that is, there is increase by 14 channels each having a bandwidth of 80 MHz or 7 channels each having a bandwidth of 160 MHz. This makes a sufficient number of frequency resources available, and a study has been performed to increase the maximum channel bandwidth usable by a single wireless LAN communication system (equivalent to a BSS to be described below) from the 160 MHz in IEEE 802.11ax to double, 320 MHz, in IEEE 802.11be (see NPL 1).

The reduction of latency has been studied in IEEE 802.11be (see NPL 2). In this study, a low latency of 1 millisecond or less is under study.

CITATION LIST

Non Patent Literature

NPL 1: IEEE 802.11-20/0693-01-00be, May. 2020
NPL 2: IEEE 802.11-20/0418-00-00be

SUMMARY OF INVENTION

Technical Problem

In the wireless LAN in the related art, CSMA/CA based access control is performed and the latency is largely affected by a congestion state of a channel. Specifically, in a case that carrier sense is successful and a transmission occasion is not acquired, it is necessary to further wait for a prescribed random time (perform random backoff) in order to perform transmission. In a case that the channel is congested, a situation in which a transmission occasion is not acquired continues, and as a result, there is a problem in that communication latency increases.

Solution to Problem

A radio communication apparatus and a radio communication method according to an aspect of the present invention for solving the aforementioned problem are as follows.

(1) Specifically, a radio communication apparatus according to an aspect of the present invention simultaneously uses multiple radio channels, the radio communication apparatus includes a radio communicator, and a radio controller, wherein the radio controller uses multiple transmission methods, at least one of the multiple transmission methods is a method for reducing latency, at least one radio channel of the multiple radio channels is allocated to the method for reducing latency, a beacon is transmitted on the multiple radio channels by use of the radio communicator, and information transmitted in the beacon includes an information element indicating the at least one radio channel allocated to the method for reducing latency.

(2) In the radio communication apparatus according to an aspect of the present invention, the beacon including the information element indicating the at least one radio channel allocated to the method for reducing latency is more frequently transmitted than a beacon not including the information element indicating the at least one radio channel allocated to the method for reducing latency.

(3) In the radio communication apparatus according to an aspect of the present invention, in a case that the radio communication apparatus receives an association request from another different radio communication apparatus and transmits an association response to the other radio communication apparatus, the association response includes the information element indicating the at least one radio channel allocated to the method for reducing latency.

(4) In the radio communication apparatus according to an aspect of the present invention, a minimum period during which the at least one radio channel allocated to the method for reducing latency is changed is configured, and an information element including information indicating the minimum period configured is included in the beacon.

(5) A radio communication apparatus according to an aspect of the present invention simultaneously uses multiple radio channels, the radio communication apparatus includes: a radio communicator; and a radio controller, wherein the radio controller uses multiple transmission methods, at least one of the multiple transmission methods is a method for reducing latency, at least one radio channel of the multiple radio channels is allocated to the method for reducing latency, a trigger frame is transmitted on the at least one radio channel allocated to the method for reducing latency, and the trigger frame includes information indicating that transmission is to be performed by the method for reducing latency.

(6) In the radio communication apparatus according to an aspect of the present invention, a level of carrier sense performed prior to the transmission of the trigger frame including the information indicating that the transmission is to be performed by the method for reducing latency is changed from a level of carrier sense performed prior to transmission of a trigger frame not including the information indicating that transmission is to be performed by the method for reducing latency.

(7) In the radio communication apparatus according to an aspect of the present invention, after the transmission of the trigger frame including the information indicating that the transmission is to be performed by the method for reducing latency is indicated by another radio communication apparatus other than the radio communication apparatus, the transmission of the trigger frame including the information indicating that the transmission is to be performed by the method for reducing latency is performed.

(8) A radio communication method according to an aspect of the present invention simultaneously uses multiple radio channels, the radio communication method including: using multiple transmission methods, at least one of the multiple transmission methods being a method for reducing latency; allocating at least one radio channel of the multiple radio channels to the method for reducing latency; and transmitting a beacon on the multiple radio channels, information transmitted in the beacon including an information element indicating the at least one radio channel allocated to the method for reducing latency.

Advantageous Effects of Invention

According to an aspect of the present invention, in a wireless LAN communication system, it is possible to efficiently transmit information of a radio channel used for low-latency communication to a terminal apparatus to improve the efficiency of the low-latency communication.

BRIEF DESCRIPTION OF DRAWINGS

FIG. 1 is a diagram illustrating an example of a frame configuration according to an aspect of the present invention.

FIG. 10 is an example of information related to an address of a frame according to an aspect of the present invention.

DESCRIPTION OF EMBODIMENTS

Figure 2:
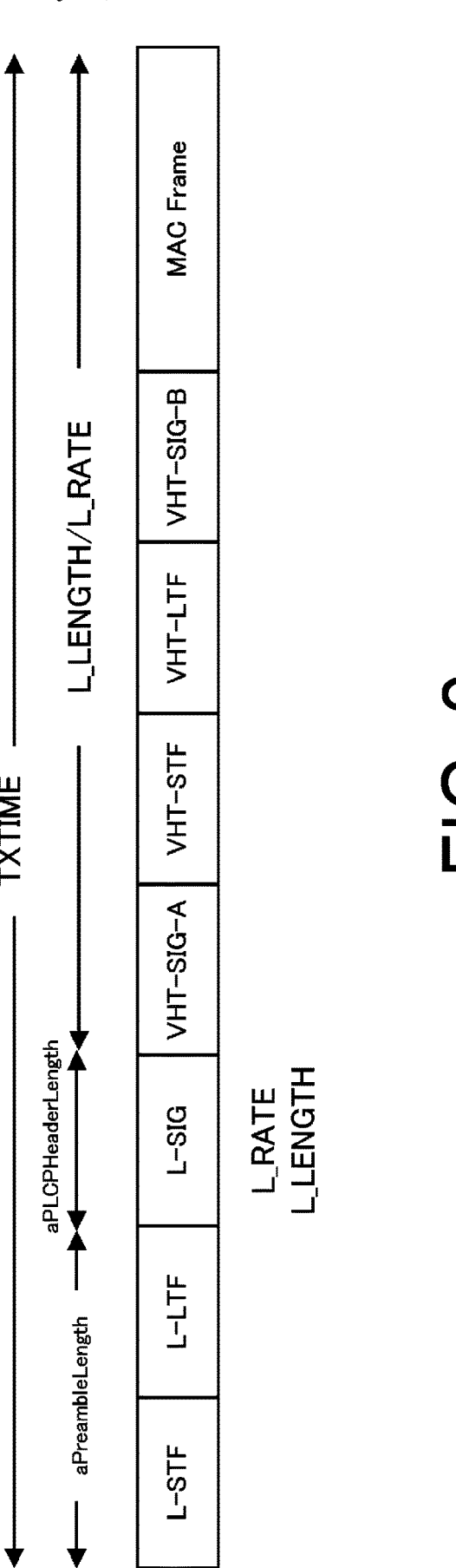
FIG. 2 is a diagram illustrating an example of a frame configuration according to an aspect of the present invention.

A communication system according to the present embodiment includes a radio transmission apparatus (an access point apparatus or a base station apparatus that is an access point or a base station apparatus) and multiple radio terminal apparatuses (station apparatuses or terminal apparatuses that are stations or terminal apparatuses). A network including the base station apparatus and terminal apparatuses is called a basic service set (BSS or a control range). In addition, the station apparatus according to the present embodiment can have functions of the access point apparatus. Similarly, the access point apparatus according to the present embodiment can have functions of the station apparatus. Therefore, in a case that a communication apparatus is simply mentioned below, the communication apparatus can indicate both the station apparatus and the access point apparatus.

The base station apparatus and the terminal apparatuses in the BSS are assumed to perform communication based on Carrier sense multiple access with collision avoidance (CSMA/CA). Although the present embodiment is intended for an infrastructure mode in which a base station apparatus performs communication with multiple terminal apparatuses, the method of the present embodiment can also be performed in an ad hoc mode in which terminal apparatuses perform communication directly with each other. In the ad hoc mode, a terminal apparatus substitutes for a base station apparatus to form a BSS. The BSS in the ad hoc mode may also be referred to as an independent basic service set (IBSS). In the following description, a terminal apparatus that forms an IBSS in the ad hoc mode can also be considered to be a base station apparatus. The method of the present embodiment can also be implemented in Wi-Fi Direct (trade name) in which terminal apparatuses directly communicate with each other. In the Wi-Fi Direct, a terminal apparatus substitutes for a base station apparatus to form a Group. In the following description, a Group owner terminal apparatus that forms a Group in the Wi-Fi Direct can also be regarded as a base station apparatus.

In an IEEE 802.11 system, each apparatus can transmit transmission frames of multiple frame types in a common frame format. Each of the transmission frames is defined as a physical (PHY) layer, a medium access control (MAC) layer, or a logical link control (LLC) layer.

A transmission frame of the PHY layer may be referred to as a physical protocol data unit (PPDU, PHY protocol data unit, or physical layer frame). The PPDU includes a physical layer header (PHY header) including header information and the like for performing signal processing in the physical layer, a physical service data unit (PSDU, PHY service data unit, or MAC layer frame) that is a data unit processed in the physical layer, and the like. The PSDU can include an aggregated MAC protocol data unit (MPDU) (A-MPDU) in which multiple MPDUs serving as retransmission units in a wireless section are aggregated.

A PHY header includes a reference signal such as a short training field (STF) used for detection, synchronization, and the like of signals, a long training field (LTF) used for obtaining channel information for demodulating data, and the like and a control signal such as a signal (SIG) including control information for demodulating data. In addition, STFs are classified into a legacy-STF (L-STF), a high throughput-STF (HT-STF), a very high throughput-STF (VHT-STF), a high efficiency-STF (HE-STF), an extremely high through-put-STF (EHT-STF), and the like in accordance with cor-responding standards, and LTFs and SIGs are also similarly classified into an L-LTF, an HT-LTF, a VHT-LTF, an HE-LTF, an L-SIG, an HT-SIG, a VHT-SIG, an HE-SIG, and an EHT-SIG depending on the corresponding standards. The VHT-SIG is further classified into VHT-SIG-A1, VHT-SIG-A2, and VHT-SIG-B. Similarly, the HE-SIG is classified into HE-SIG-A1 to 4 and HE-SIG-B. In addition, on the assump-tion of technology update in the same standard, a universal SIGNAL (U-SIG) field including additional control infor-mation can be included.

Furthermore, the PHY header can include information for identifying a BSS of a transmission source of the transmis-sion frame (hereinafter, also referred to as BSS identification information). The information for identifying a BSS can be, for example, a service set identifier (SSID) of the BSS or a MAC address of a base station apparatus of the BSS. In addition, the information for identifying a BSS can be a value unique to the BSS (e.g., a BSS color, etc.) other than an SSID or a MAC address.

The PPDU is modulated in accordance with the corre-sponding standard. In the IEEE 802.11n standard, for example, the PPDU is modulated into an orthogonal fre-quency division multiplexing (OFDM) signal.

An MPDU includes a MAC layer header (MAC header) including header information and the like for performing signal processing in the MAC layer, a MAC service data unit (MSDU) or a frame body that is a data unit processed in the MAC layer, and a frame check sequence (FCS) for checking whether there is an error in a frame. In addition, multiple MSDUs can be aggregated as an Aggregated MSDU (A-MSDU).

The frame types of transmission frames of the MAC layer are roughly classified into three frame types, namely a management frame for managing a connection state and the like between apparatuses, a control frame for managing a communication state between apparatuses, and a data frame including actual transmission data. Each frame type is further classified into multiple kinds of subframe types. The control frame includes a reception completion notification (Acknowledge or Ack) frame, a transmission request (Re-quest to send or RTS) frame, a reception preparation completion (Clear to send or CTS) frame, and the like. The management frame includes a Beacon frame, a Probe request frame, a Probe response frame, an Authentication frame, an Association request frame, an Association response frame, and the like. The data frame includes a data frame, a polling (CF-poll) frame, and the like. Each appa-ratus can recognize the frame type and the subframe type of a received frame by interpreting contents of the frame control field included in the MAC header.

Note that an Ack may include a Block Ack. A Block Ack can give a reception completion notification with respect to multiple MPDUs.

The beacon frame includes a field in which a periodicity at which a beacon is transmitted (beacon interval) and an SSID are described. The base station apparatus can periodi-cally broadcast a beacon frame within a BSS, and each terminal apparatus can recognize the base station apparatus in the surroundings of the terminal apparatus by receiving the beacon frame. The action of the terminal apparatus recognizing the base station apparatus based on the beacon frame broadcast from the base station apparatus may be referred to as passive scanning. On the other hand, the action of the terminal apparatus searching for the base station apparatus by broadcasting a probe request frame in the BSS may be referred to as active scanning. The base station apparatus can transmit a probe response frame in response to the probe request frame, and details described in the probe response frame are equivalent to those in the beacon frame.

A terminal apparatus recognizes a base station apparatus and performs a connection process with respect to the base station apparatus. The connection process is classified into an authentication procedure and an association procedure. A terminal apparatus transmits an authentication frame (au-thentication request) to a base station apparatus that the terminal apparatus desires to connect with. Once the base station apparatus receives the authentication frame, then the base station apparatus transmits, to the terminal apparatus, an authentication frame (authentication response) including a status code indicating whether authentication can be made for the terminal apparatus. The terminal apparatus can determine whether the terminal apparatus has been authen-ticated by the base station apparatus by interpreting the status code described in the authentication frame. Note that the base station apparatus and the terminal apparatus can exchange the authentication frame multiple times.

After the authentication procedure, the terminal apparatus transmits an association request frame to the base station apparatus in order to perform the association procedure. Once the base station apparatus receives the association request frame, the base station apparatus determines whether to allow the connection to the terminal apparatus and transmits an association response frame to notify the termi-nal apparatus of the intent. In the connection response frame, an association identifier (AID) for identifying the terminal apparatus is described in addition to the status code indi-cating whether to perform the connection process. The base station apparatus can manage multiple terminal apparatuses by configuring different AIDs for the terminal apparatuses for which the base station apparatus has allowed connection.

After the connection process is performed, the base sta-tion apparatus and the terminal apparatus perform actual data transmission. In the IEEE 802.11 system, a distributed coordination function (DCF), a point coordination function (PCF), and mechanisms in which the aforementioned mechanisms are enhanced (an enhanced distributed channel access (EDCA) or a hybrid control mechanism (hybrid coordination function (HCF)), and the like) are defined. A case that the base station apparatus transmits signals to the terminal apparatus using the DCF will be described below as an example.

In the DCF, the base station apparatus and the terminal apparatus perform carrier sense (CS) for checking usage of a radio channel in the surroundings of the apparatuses prior to communication. For example, in a case that the base station apparatus serving as a transmitting station receives a signal of a higher level than a predefined clear channel assessment level (CCA level) on a radio channel, transmission of transmission frames on the radio channel is postponed. Hereinafter, a state in which a signal of a level that is equal to or higher than the CCA level is detected on the radio channel will be referred to as a busy (Busy) state, and a state in which a signal of a level that is equal to or higher than the CCA level is not detected will be referred to as an idle (Idle) state. In this manner, CS performed based on power of a signal actually received by each apparatus (reception power level) is called physical carrier sense (physical CS). Note that the CCA level is also called a carrier sense level (CS level) or a CCA threshold (CCAT). Note that, in a case that a signal of a level that is equal to or higher than the CCA level has been detected, the base station apparatus and the terminal apparatus start to perform an operation of demodulating at least a signal of the PHY layer.

The base station apparatus performs carrier sense in an inter-frame space (IFS) in accordance with the type of transmission frame to be transmitted and determines whether the radio channel is in a busy state or idle state. A period in which the base station apparatus performs carrier sense varies depending on the frame type and the subframe type of a transmission frame to be transmitted by the base station apparatus. In the IEEE 802.11 system, multiple IFSs with different periods are defined, and there are a short frame interval (Short IFS or SIFS) used for a transmission frame with the highest priority given, a polling frame interval (PCF IFS or PIFS) used for a transmission frame with a relatively high priority, a distribution control frame interval (DCF IFS or DIFS) used for a transmission frame with the lowest priority, and the like. In a case that the base station apparatus transmits a data frame with the DCF, the base station apparatus uses the DIFS.

The base station apparatus waits by DIFS and then further waits for a random backoff time to prevent frame collision. In the IEEE 802.11 system, a random backoff time called a contention window (CW) is used. CSMA/CA works with the assumption that a transmission frame transmitted by a certain transmitting station is received by a receiving station in a state in which there is no interference from other transmitting stations. Therefore, in a case that transmitting stations transmit transmission frames at the same timing, the frames collide against each other, and the receiving station cannot receive them properly. Thus, each transmitting station waits for a randomly configured time before starting transmission, and thus collision of frames can be avoided. In a case that the base station apparatus determines, through carrier sense, that a radio channel is in the idle state, the base station apparatus starts to count down a CW, acquires a transmission privilege for the first time after the CW becomes zero, and can transmit a transmission frame to the terminal apparatus. Note that, in a case that the base station apparatus determines through the carrier sense that the radio channel is in the busy state during the count-down of the CW, the base station apparatus stops the count-down of the CW. Thereafter, in a case that the radio channel becomes in the idle state, then the base station apparatus restarts the count-down of the remaining CW after the previous IFS.

Next, details of frame reception will be described. A terminal apparatus that is a receiving station receives a transmission frame, interprets the PHY header of the transmission frame, and demodulates the received transmission frame. Then, the terminal apparatus interprets the MAC header of the demodulated signal and thus can recognize whether the transmission frame is addressed to the terminal apparatus itself. Note that the terminal apparatus can also determine the destination of the transmission frame based on information described in the PHY header (for example, a group identifier (Group ID or GID) described in VHT-SIG-A).

In a case that the terminal apparatus determines that the received transmission frame is addressed to the terminal apparatus and successfully demodulates the transmission frame without any error, the terminal apparatus is to transmit an ACK frame indicating the proper reception of the frame to the base station apparatus that is the transmitting station. The ACK frame is one of transmission frames with the highest priority transmitted only after a wait for the SIFS period (with no random backoff time). The base station apparatus ends the series of communication with the reception of the ACK frame transmitted from the terminal apparatus. Note that, in a case that the terminal apparatus is not able to receive the frame properly, the terminal apparatus does not transmit ACK. Thus, in a case that the ACK frame has not been received from the receiving station for a certain period (a length of SIFS+ACK frame) after the transmission of the frame, the base station apparatus considers the communication to be failed and ends the communication. In this manner, an end of a single communication operation (also called a burst) in the IEEE 802.11 system is to be determined based on whether an ACK frame is received, except for special cases such as a case of transmission of a broadcast signal such as a beacon frame, a case that fragmentation for splitting transmission data is used, or the like.

In a case that the terminal apparatus determines that the received transmission frame is not addressed to the terminal apparatus itself, the terminal apparatus configures a network allocation vector (NAV) based on the length of the transmission frame described in the PHY header or the like. The terminal apparatus does not attempt communication during the period configured in the NAV. In other words, because the terminal apparatus performs the same operation as in the case that the terminal apparatus determines the radio channel is in the busy state through physical CS for the period configured in the NAV, the communication control based on the NAV is also called virtual carrier sense (virtual CS). The NAV is also configured by a transmission request (Request to send or RTS) frame or a reception preparation completion (Clear to send or CTS) frame, which are introduced to solve a hidden terminal problem in addition to the case that the NAV is configured based on the information described in the PHY header.

Unlike the DCF in which each apparatus performs carrier sense and autonomously acquires the transmission privilege, with respect to the PCF, a control station called a point coordinator (PC) controls the transmission privilege of each apparatus within a BSS. In general, a base station apparatus serves as a PC and acquires the transmission privilege of a terminal apparatus within a BSS.

A communication period using the PCF includes a Non-period (Contention free period (CFP)) and a Contention period (CP). Communication is performed based on the aforementioned DCF during a CP, and a PC controls the transmission privilege during a CFP. The base station apparatus serving as a PC broadcasts a beacon frame with description of a CFP period (CFP max duration) and the like in a BSS prior to communication with a PCF. Note that the PIFS is used for transmission of the beacon frame broadcast at the time of a start of transmission by the PCF, and the beacon frame is transmitted without waiting for the CW. The terminal apparatus that has received the beacon frame configures the CFP period described in the beacon frame in a NAV. Hereinafter, the terminal apparatus can acquire the transmission privilege only in a case that a signal (e.g., a data frame including CF-poll) for signalling the acquisition of the transmission privilege transmitted by the PC is received, until the NAV elapses or a signal (e.g., a data frame including CF-end) broadcasting the end of the CFP in the BSS is received. Note that, because no packet collision occurs in the same BSS during the CFP period, each terminal apparatus does not take a random backoff time used for the DCF.

Figure 4:
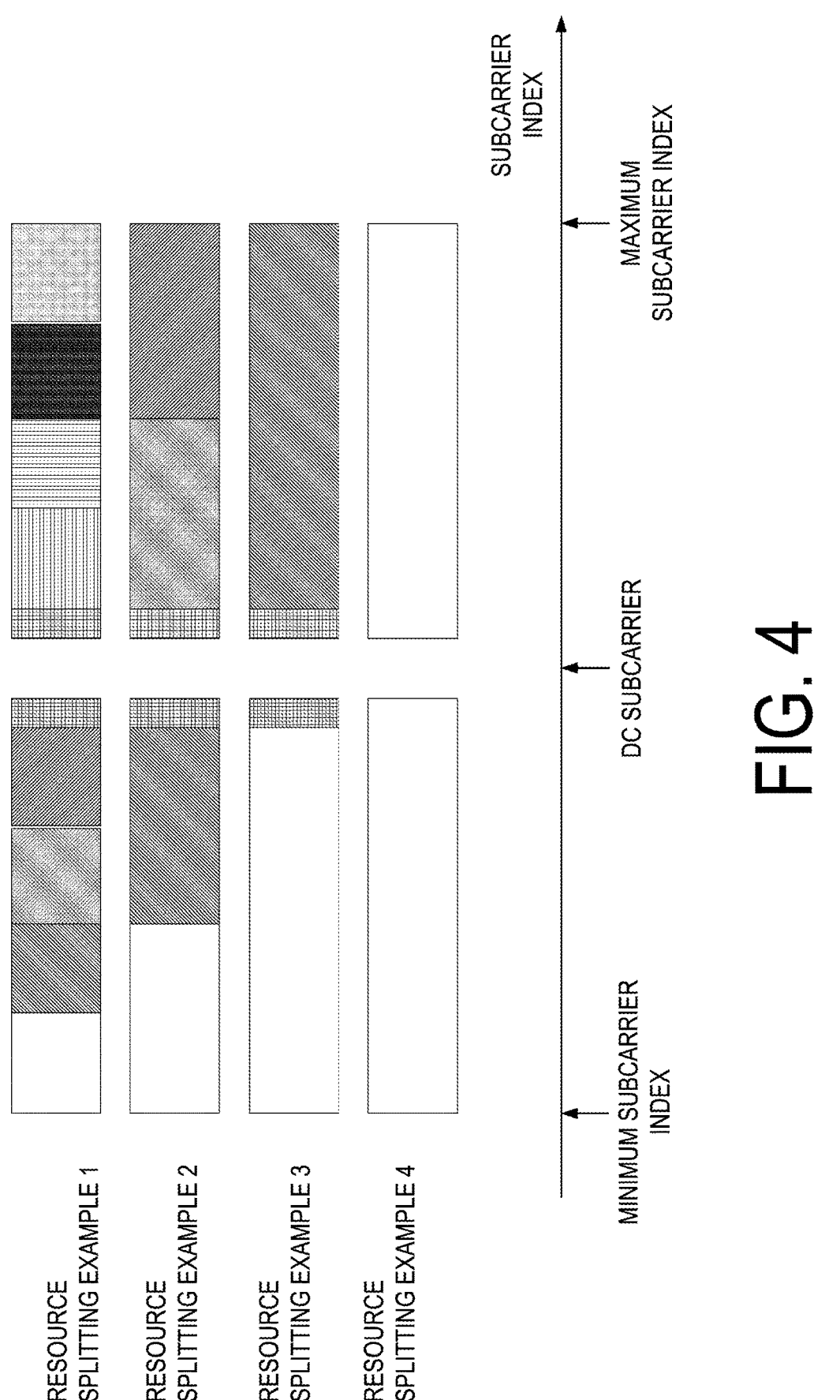
FIG. 4 is a schematic diagram illustrating examples of splitting radio resources according to an aspect of the present invention.

A radio medium can be split into multiple resource units (RUs). FIG. 4 is a schematic diagram illustrating an example of a split state of a radio medium. In the resource splitting example 1, for example, a radio communication apparatus can split a frequency resource (subcarrier) that is a radio medium into nine RUs. Similarly, in the resource splitting example 2, the radio communication apparatus can split a subcarrier that is a radio medium into five RUs. It is a matter of course that the resource splitting examples illustrated in FIG. 4 are merely examples, and for example, the multiple RUs can include a different number of subcarriers. The radio medium that is split into RUs can include not only a frequency resource but also a spatial resource. The radio communication apparatus (e.g., an AP) can transmit frames to multiple terminal apparatuses (e.g., multiple STAs) at the same time by mapping frames addressed to different terminal apparatuses to the respective RUs. An AP can describe information indicating a split state of the radio medium (resource allocation information) as common control information in the PHY header of the frame transmitted by the AP itself. Moreover, the AP can describe information indicating an RU to which a frame addressed to each STA is mapped (resource unit assignment information) as unique control information in the PHY header of the frame transmitted by the AP itself.

Multiple terminal apparatuses (e.g., multiple STAs) can transmit frames at the same time by mapping and transmitting the frames to and in the respective RUs allocated to themselves. The multiple STAs can perform frame transmission after waiting for a prescribed period after receiving the frame including trigger information transmitted from the AP (trigger frame or TF). Each STA can recognize the RU allocated to the STA itself based on the information described in the TF. Each STA can acquire the RU through random access with reference to the TF.

The AP can allocate multiple RUs to one STA at the same time. The multiple RUs can include continuous subcarriers or can include discontinuous subcarriers. The AP can transmit one frame using multiple RUs allocated to one STA or can transmit multiple frames after allocating them to different RUs. At least one of the multiple frames can be a frame including common control information for multiple terminal apparatuses that transmit resource allocation information.

One STA can be allocated multiple RUs by the AP. The STA can transmit one frame using the multiple allocated RUs. Also, the STA can use the multiple allocated RUs to transmit multiple frames allocated to different RUs. The multiple frames each can be a frame of a different frame type.

The AP can allocate multiple AIDs to one STA. The AP can allocate an RU to each of the multiple AIDs allocated to the one STA. The AP can transmit different frames using the respective RUs allocated to the multiple AIDs allocated to the one STA. The different frames each can be a frame of a different frame type.

One STA can be allocated multiple AIDs by the AP. The one STA can be allocated an RU with respect to each of the multiple allocated AIDs. The one STA recognizes all of the RUs allocated to the respective multiple AIDs allocated to the STA itself as RUs allocated to the STA and can transmit one frame using the multiple allocated RUs. In addition, the one STA can transmit multiple frames using the multiple allocated RUs. At this time, the multiple frames can be transmitted with information indicating the AIDs associated with the respective allocated RUs described therein. The AP can transmit different frames using the respective RUs allocated to the multiple AIDs allocated to the one STA. The different frames can be frames of different frame types.

Hereinafter, the base station apparatus and the terminal apparatuses may be collectively referred to as radio communication apparatuses or communication apparatuses. Information exchanged in a case that a certain radio communication apparatus performs communication with another radio communication apparatus may also be referred to as data. In other words, radio communication apparatuses include a base station apparatus and a terminal apparatus.

A radio communication apparatus includes any one of or both the function of transmitting a PPDU and a function of receiving a PPDU. FIG. 1 is a diagram illustrating examples of configurations of a PPDU transmitted by a radio communication apparatus. A PPDU that is compliant with the IEEE 802.11a/b/g standard includes L-STF, L-LTF, L-SIG, and a Data frame (a MAC Frame, a MAC frame, a payload, a data part, data, information bits, and the like). A PPDU that is compliant with the IEEE 802.11n standard includes L-STF, L-LTF, L-SIG, HT-SIG, HT-STF, HT-LTF, and a Data frame. A PPDU that is compliant with the IEEE 802.11ac standard includes some or all of L-STF, L-LTF, L-SIG, VHT-SIG-A, VHT-STF, VHT-LTF, VHT-SIG-B, and a MAC frame. A PPDU studied in the IEEE 802.11ax standard includes some or all of L-STF, L-LTF, L-SIG, RL-SIG in which L-SIG is temporally repeated, HE-SIG-A, HE-STF, HE-LTF, HE-SIG-B, and a Data frame. A PPDU studied in the IEEE 802.11be standard includes some or all of L-STF, L-LTF, L-SIG, RL-SIG, U-SIG, EHT-SIG, EHT-STF, HET-LTF, and a Data frame.

L-STF, L-LTF, and L-SIG surrounded by the dotted line in FIG. 1 are configurations commonly used in the IEEE 802.11 standard (hereinafter, L-STF, L-LTF, and L-SIG may also be collectively referred to as an L-header). For example, a radio communication apparatus that is compliant with the IEEE 802.11a/b/g standard can appropriately receive an L-header in a PPDU that is compliant with the IEEE 802.11n/ac standard. A radio communication apparatus that is compliant with the IEEE 802.11a/b/g standard can receive the PPDU that is compliant with the IEEE 802.11n/ac standard while considering it to be a PPDU that is compliant with the IEEE 802.11a/b/g standard.

However, because the radio communication apparatus that is compliant with the IEEE 802.11a/b/g standard cannot demodulate the PPDU that is compliant with the IEEE 802.11n/ac standard following the L-header, it is not possible to demodulate information about a transmitter address (TA), a receiver address (RA), and a Duration/ID field used for configuring a NAV.

As a method for the radio communication apparatus that is compliant with the IEEE 802.11a/b/g standard to appropriately configure a NAV (or to perform a receiving operation for a prescribed period), IEEE 802.11 defines a method of inserting Duration information to the L-SIG. Information about a transmission speed in the L-SIG (a RATE field, an L-RATE field, an L-RATE, an L_DATARATE, and an L_DATARATE field) and information about a transmission period (a LENGTH field, an L-LENGTH field, and an L-LENGTH) are used by the radio communication apparatus that is compliant with the IEEE 802.11a/b/g standard to appropriately configure a NAV.

FIG. 2 is a diagram illustrating an example of a method for Duration information inserted into an L-SIG. Although a PPDU configuration that is compliant with the IEEE 802.11ac standard is illustrated as an example in FIG. 2, a PPDU configuration is not limited thereto. A PPDU configuration that is compliant with the IEEE 802.11n standard and a PPDU configuration that is compliant with the IEEE 802.11ax standard may be employed. TXTIME includes information about a length of a PPDU, aPreambleLength includes information about a length of a preamble (L-STF+ L-LTF), and aPLCPHeaderLength includes information about a length of a PLCP header (L-SIG). L_LENGTH is calculated based on Signal Extension that is a virtual period configured for compatibility with the IEEE 802.11 standard, $N_{ops}$ related to L-RATE, aSymbol Length that is information about a period of one symbol (a symbol, an OFDM symbol, or the like), aPLCPServiceLength indicating the number of bits included in PLCP Service field, and aPLCPConvolutionalTailLength indicating the number of tail bits of a convolution code. The radio communication apparatus can calculate L_LENGTH and insert L_LENGTH into L-SIG. The radio communication apparatus can calculate L-SIG Duration. L-SIG Duration indicates information about a PPDU including L_LENGTH and information about a period that is the sum of periods of Ack and SIFS expected to be transmitted by the destination radio communication apparatus in response to the PPDU.

Figure 3:
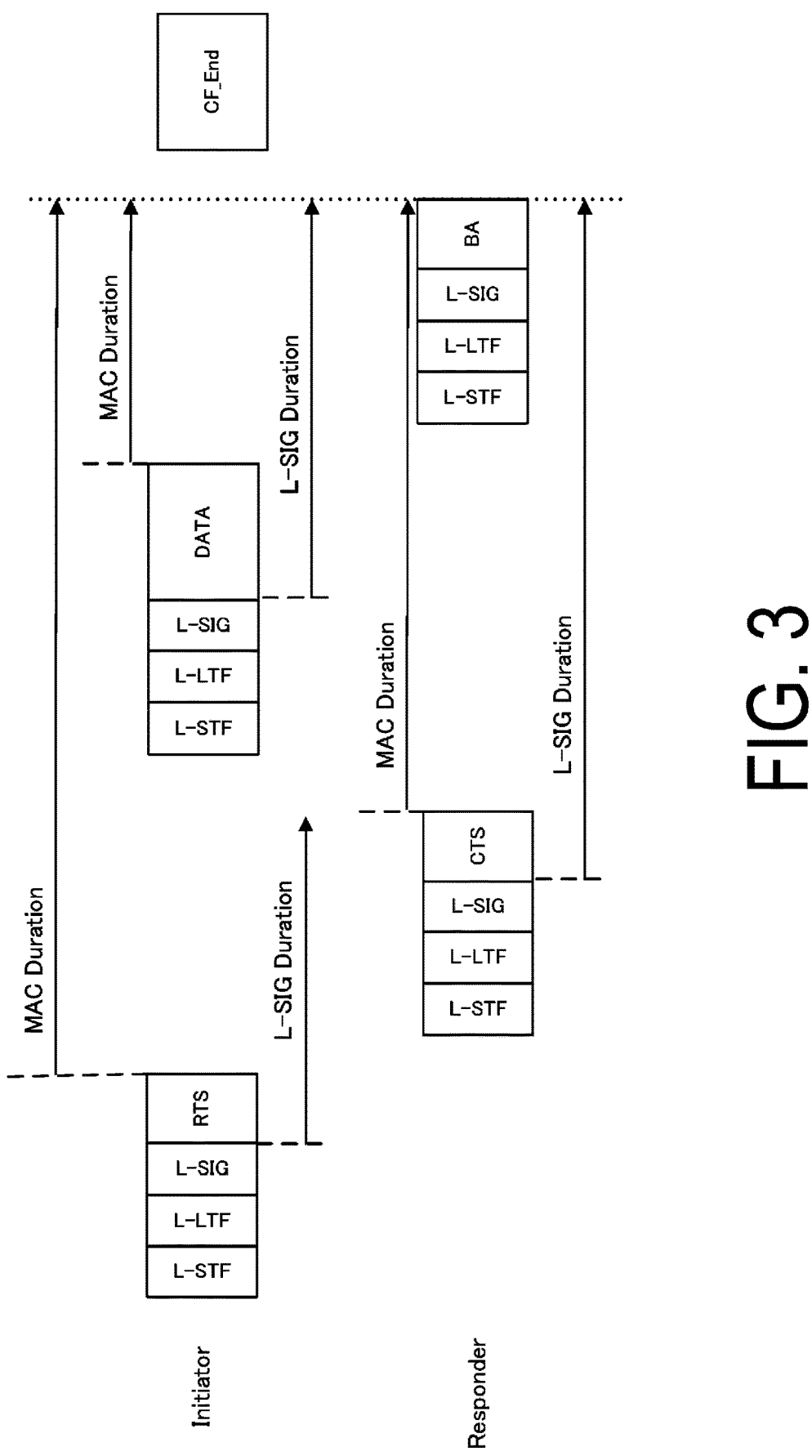
FIG. 3 is a diagram illustrating an example of communication according to an aspect of the present invention.

FIG. 3 is a diagram illustrating an example of L-SIG Duration in L-SIG TXOP Protection. DATA (a frame, a payload, data, and the like) include some of or both the MAC frame and the PLCP header. BA includes Block Ack or Ack. A PPDU includes L-STF, L-LTF, and L-SIG and can further include any one or more of DATA, BA, RTS, or CTS. Although L-SIG TXOP Protection using RTS/CTS is illustrated in the example illustrated in FIG. 3, CTS-to-Self may be used. Here, MAC Duration is a period indicated by a value of Duration/ID field. Initiator can transmit a CF_End frame for providing a notification regarding an end of the L-SIG TXOP Protection period.

Next, a method of identifying a BSS from a frame received by a radio communication apparatus will be described. In order for a radio communication apparatus to identify a BSS from a received frame, the radio communication apparatus that transmits a PPDU preferably inserts information for identifying the BSS (BSS color, BSS identification information, or a value unique to the BSS) into the PPDU. The information indicating the BSS color can be described in HE-SIG-A.

The radio communication apparatus can transmit L-SIG multiple times (L-SIG Repetition). For example, demodulation accuracy of L-SIG is improved by the radio communication apparatus on the reception side receiving L-SIG transmitted multiple times by using Maximum Ratio Combining (MRC). Moreover, in a case that reception of L-SIG is properly completed using MRC, the radio communication apparatus can interpret the PPDU including the L-SIG as a PPDU that is compliant with the IEEE 802.11ax standard.

Even during the operation of receiving the PPDU, the radio communication apparatus can perform an operation of receiving part of a PPDU other than the corresponding PPDU (e.g., the preamble, L-STF, L-LTF, and the PLCP header prescribed by IEEE 802.11) (also referred to as a double-reception operation). In a case that a part of a PPDU other than the PPDU is detected during the operation of receiving the PPDU, the radio communication apparatus can update a part or an entirety of information about a destination address, a transmission source address, a PPDU, or a DATA period.

An Ack and a BA can also be referred to as a response (response frame). A probe response, an authentication response, and a connection response can also be referred to as a response.

1. First Embodiment

Figure 5:
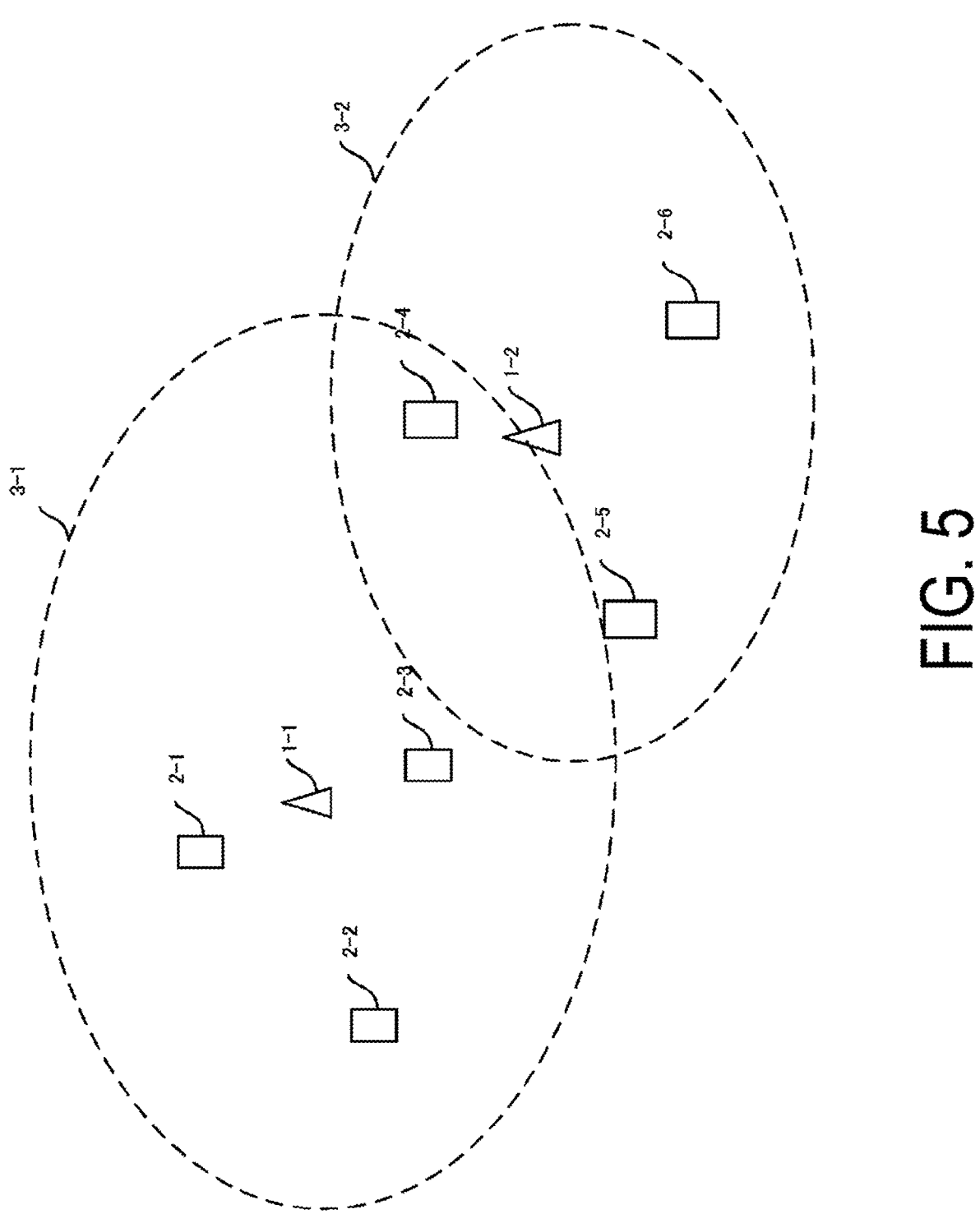
FIG. 5 is a diagram illustrating a configuration example of a communication system according to an aspect of the present invention.

FIG. 5 is a diagram illustrating an example of a radio communication system according to the present embodiment. A radio communication system 3-1 includes a radio communication apparatus 1-1 and radio communication apparatuses 2-1 to 2-3. Note that the radio communication apparatus 1-1 may also be referred to as a base station apparatus 1-1, and the radio communication apparatuses 2-1 to 2-3 may also be referred to as terminal apparatuses 2-1 to 2-3. Each of the radio communication apparatuses 2-1 to 2-3 and each of the terminal apparatuses 2-1 to 2-3 may also be referred to as a radio communication apparatus 2A and a terminal apparatus 2A, respectively, as an apparatus connected to the radio communication apparatus 1-1. The radio communication apparatus 1-1 and the radio communication apparatus 2A are wirelessly connected and are in a state in which they can transmit and/or receive PPDUs to and from each other. The radio communication system according to the present embodiment may include a radio communication system 3-2 in addition to the radio communication system 3-1. The radio communication system 3-2 includes a radio communication apparatus 1-2 and radio communication apparatuses 2-4 to 2-6. Note that the radio communication apparatus 1-2 may also be referred to as a base station apparatus 1-2 and the radio communication apparatuses 2-4 to 2-6 may also be referred to as terminal apparatuses 2-4 to 2-6. Each of the radio communication apparatuses 2-4 to 2-6 and each of the terminal apparatuses 2-4 to 2-6 may also be referred to as a radio communication apparatus 2B and a terminal apparatus 2B, respectively, as an apparatus connected to the radio communication apparatus 1-2. Although the radio communication system 3-1 and the radio communication system 3-2 form different BSSs, this does not necessarily mean that Extended Service Sets (ESSs) are different. An ESS indicates a service set forming a local area network (LAN). In other words, radio communication apparatuses belonging to the same ESS can be regarded as belonging to the same network from a higher layer. The BSSs are connected via a Distribution System (DS) and form an ESS. Note that each of the radio communication systems 3-1 and 3-2 can further include multiple radio communication apparatuses.

In FIG. 5, it is assumed that signals transmitted by the radio communication apparatus 2A arrive at the radio transmission apparatus 1-1 and the radio communication apparatus 2B, but do not arrive at the radio communication apparatus 1-2 in the following description. In other words, in a case that the radio communication apparatus 2A transmits a signal using a certain channel, the radio communication apparatus 1-1 and the radio communication apparatus 2B determine that the channel is in the busy state, whereas the radio communication apparatus 1-2 determines that the channel is in the idle state. It is assumed that signals transmitted by the radio communication apparatus 2B arrive at the radio transmission apparatus 1-2 and the radio communication apparatus 2A, but do not arrive at the radio communication apparatus 1-1. In other words, in a case that the radio communication apparatus 2B transmits a signal using a certain channel, the radio communication apparatus 1-2 and the radio communication apparatus 2A determine that the channel is in the busy state, whereas the radio communication apparatus 1-1 determines that the channel is in the idle state.

Figure 11:
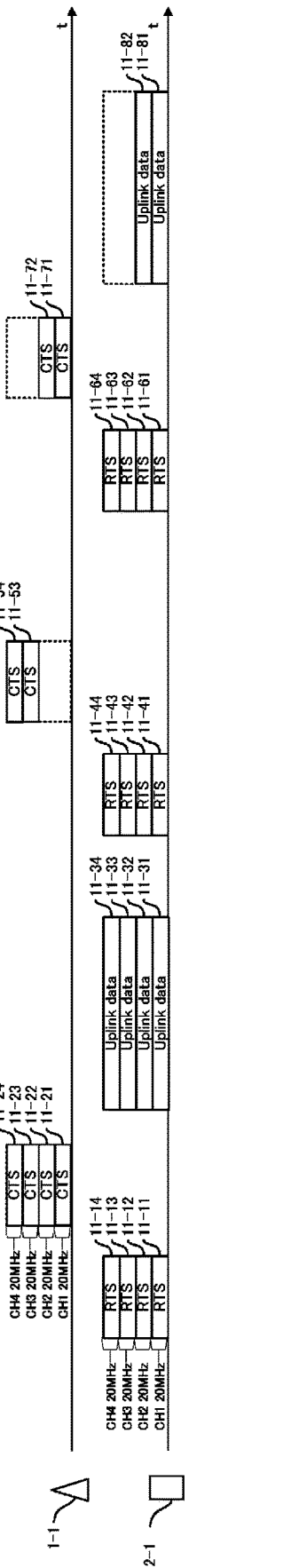
FIG. 11 is a diagram illustrating a frame transmission and/or reception according to an aspect of the present invention.

FIG. 11 is used to further describe that, in the IEEE 802.11 system, the acquisition of the transmission privilege is performed every 20 MHz bandwidth. For example, it is assumed that IEEE 802.11ax compliant access point apparatuses constitute a radio communication system that uses the 80 MHz bandwidth in total from a CH 1 to a CH 4 each of which is of 20 MHz bandwidth. Any one of the CH 1 to the CH 4 is configured as a primary channel, and the acquisition of the transmission privilege based on a backoff time count and the carrier sense in the primary channel also affects the acquisition of the transmission privilege in the other channels. For example, in a case that the CH 1 is configured as the primary channel, the CH 2 adjacent to the CH 1 is referred to as a secondary channel, a combination of the CH 1 and the CH 2 is referred to as a 40 MHz Primary channel, and a combination of the CH 3 and the CH 4 adjacent to the 40 MHz Primary channel is referred to as a 40 MHz Secondary channel.

An example of a frame transmission procedure in a case that the station apparatus 2-1 transmits a frame to the access point apparatus 1-1 on the assumption that the primary channel is configured as the CH 1 will be described. The station apparatus 2-1, in a case of performing carrier sense in the CH 1 after waiting for the random backoff time to determine that the radio channel is in the idle state, transmits an RTS frame 11-11 onto the CH 1 and transmits equivalent frames as RTS frames 11-12 to 11-14 to the CH 2 to the CH 4 at the same timing. The access point apparatus 1-1 receiving the RTS frame checks the radio channel conditions of the CH 1 to the CH 4. In a case of determining that the radio channel conditions are the idle states, the access point apparatus 1-1 transmits CTS frames 11-21 to 11-24 indicating the idle states to the CH 1 to the CH 4, respectively, and the station apparatus 2-1 receives the CTS frames 11-21 to 11-24. The station apparatus determines that the radio channels of the CH 1 to the CH 4 are available, and transmits data frames 11-31 to 11-34. Specifically, the entire channel bandwidth 80 MHz can be used for data frame transmission.

On the other hand, even in a case that the station apparatus 2-1 transmits the RTS frame, there may be a case that the CTS frame cannot be received on all of the CH 1 to the CH 4. For example, that is a case that the access point apparatus 1-1 receiving the RTS frames 11-41 to 11-44 on the CH 1 to the CH 4, respectively, checks the radio channel conditions to determine that only the CH 3 and the CH 4 are in the idle states, and transmits the CTS frames (11-53 and 11-54) only to the CH 3 and the CH 4. The station apparatus 2-1, in a case of being incapable of receiving the CTS frame on the CH 1 which is the primary channel, cannot transmit the data frames on any of the CH 1 to the CH 4. Specifically, the determination on whether to transmit the data frame depends on the condition of the primary channel.

As another example, there is a case that the CTS frame is received on the CH 1 which is the primary channel but the CTS frame cannot be received on all of the CH 1 to the CH 4. For example, that is a case that the access point apparatus receiving the RTS frames 11-61 to 11-64 on the CH 1 to the CH 4, respectively, checks the radio channel conditions to determine that only the CH 1 and the CH 2 are in the idle states, and transmits the CTS frames (11-71 and 11-72) to only the CH 1 and the CH 2. The station apparatus 2-1 is capable of data frame transmission because of having received the CTS frame on the CH 1 which is the primary channel, but recognizes that only the CH 1 and the CH 2 are in the idle states and transmits data frames 11-81 and 11-82. Specifically, only the 40 MHz bandwidth can be used in the 80 MHz bandwidth.

Figure 9:
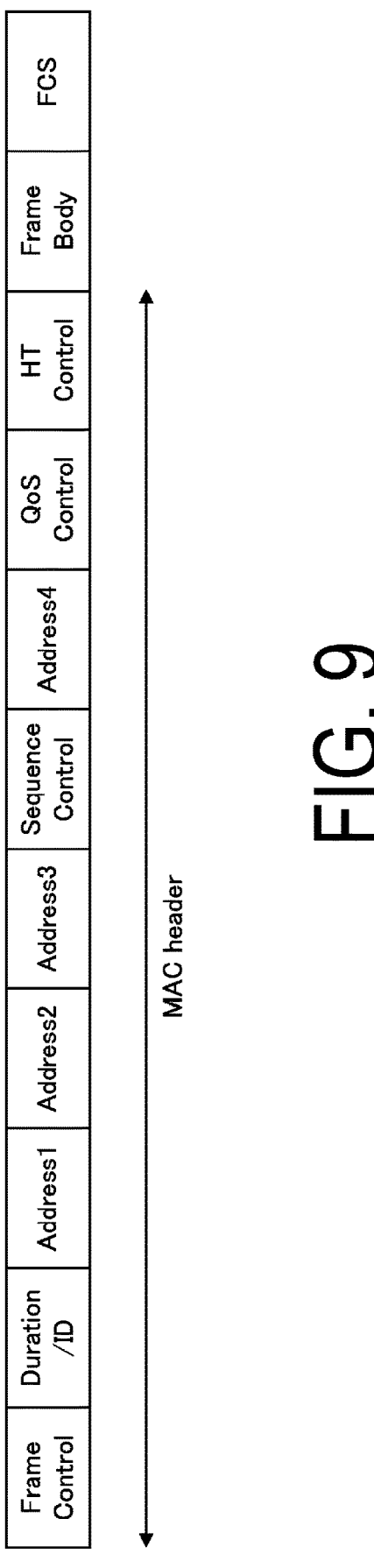
FIG. 9 is a diagram illustrating an example of a frame configuration according to an aspect of the present invention.

FIG. 9 illustrates an example of a MAC Frame format. The MAC Frame described herein refers to a Data frame in FIG. 1 (a MAC Frame, a MAC frame, a payload, a data part, data, an information bit, and the like) and a MAC Frame in FIG. 2. The MAC Frame includes Frame Control, Duration/ID, Address 1, Address 2, Address 3, Sequence Control, Address 4, QoS Control, HT Control, Frame Body, and FCS.

In FIG. 10, addresses written in the fields of Address 1, Address 2, Address 3, and Address 4 included in FIG. 9 are classified according to values of FromDS and ToDS and are summarized in a table. The information of FromDS and ToDS is included in the Frame Control field in FIG. 9. The value of FromDS is 1 in a case that a frame is transmitted from the DS, and 0 in a case that a frame is transmitted from a device other than the DS. The value of ToDS is 1 in a case that a frame is received by the DS and 0 in a case that a frame is received by a device other than the DS. Note that SA indicates a Source Address (transmission source address, reference source address) and DA indicates a Destination Address (destination address, transfer destination address). The table in FIG. 10 illustrates that meanings of Address 1 to Address 4 change depending on the values of FromDS and ToDS. Note that, in a case that ToDS is 0 and FromDS is 0, Address 1 indicates "RA=DA" where "RA" connects to "DA" by "=", which indicates that RA and DA are the same address. Also in other combinations, the addresses connected by "=" indicate that the addresses are the same.

Figure 6:
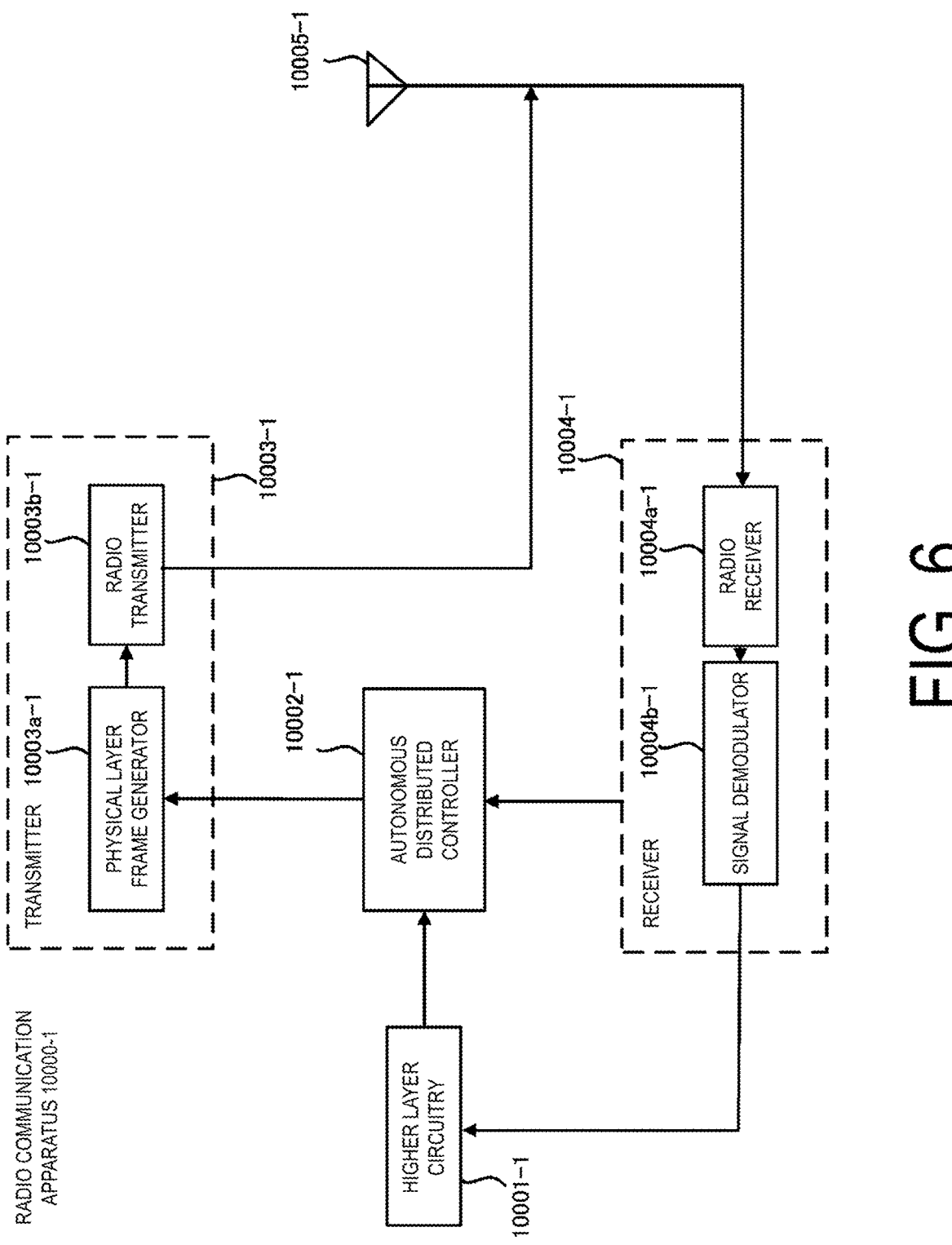
FIG. 6 is a block diagram illustrating a configuration example of a radio communication apparatus according to an aspect of the present invention.

FIG. 6 is a diagram illustrating an example of an apparatus configuration of each of the radio communication apparatuses 1-1, 1-2, 2A, and 2B (hereinafter, also collectively referred to as a radio communication apparatus 10000-1). The radio communication apparatus 10000-1 includes a higher layer circuitry (higher layer processing step) 10001-1, an autonomous distributed controller (autonomous distributed control step) 10002-1, a transmitter (transmission step) 10003-1, a receiver (reception step) 10004-1, and an antenna unit 10005-1. The higher layer circuitry 10001-1 and the autonomous distributed controller 10002-1 are collectively referred to as a radio controller. The transmitter 10003-1, the receiver 10004-1, and the antenna unit 10005-1 are collectively referred to as a radio communicator.

The higher layer circuitry 10001-1 is connected to another network and can notify the autonomous distributed controller 10002-1 of information about traffic. The information about traffic may be, for example, information addressed to another radio communication apparatus, or may be control information included in a management frame or a control frame.

Figure 7:
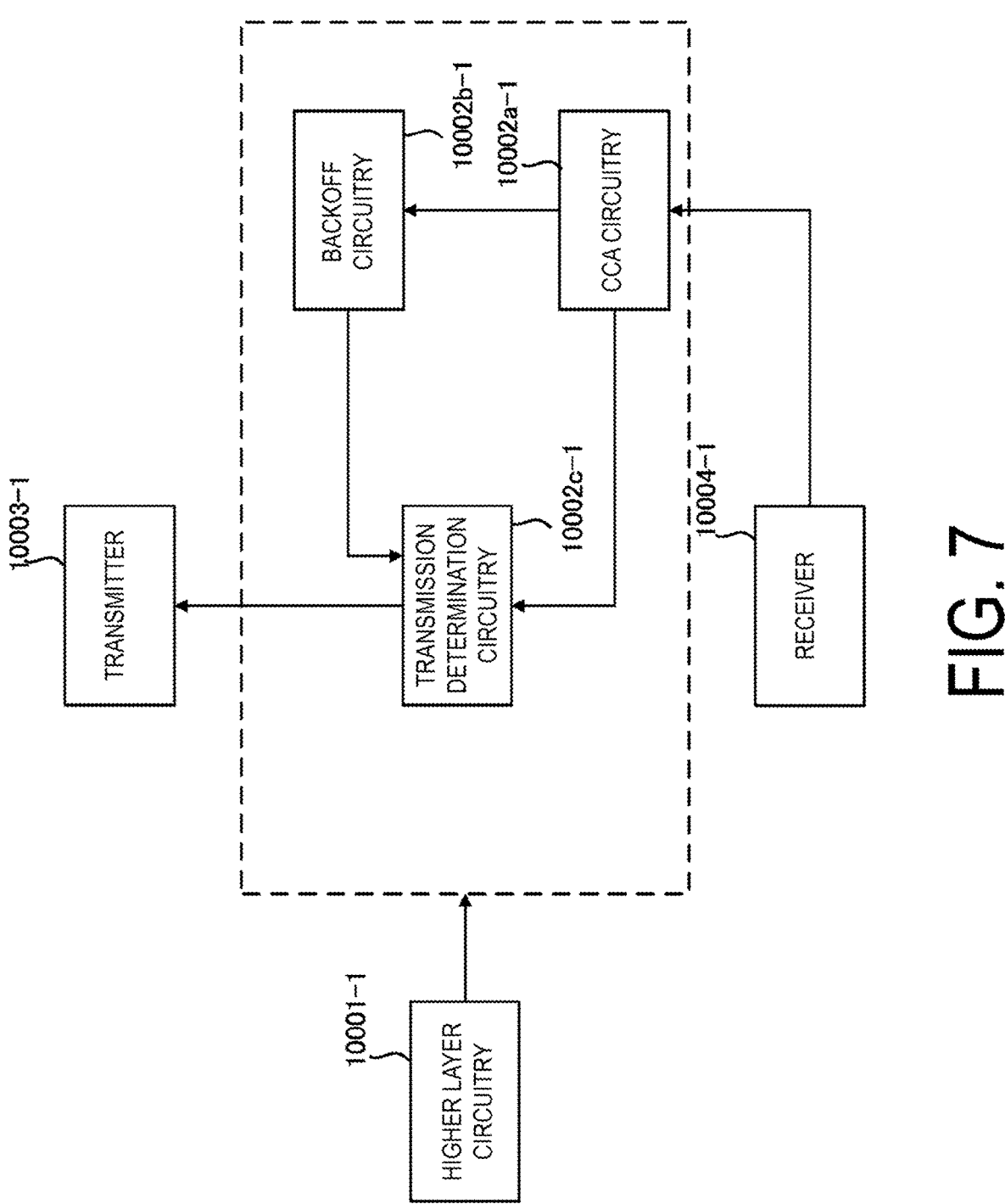
FIG. 7 is a block diagram illustrating a configuration example of a radio communication apparatus according to an aspect of the present invention.

FIG. 7 is a diagram illustrating an example of an apparatus configuration of the autonomous distributed controller 10002-1. The autonomous distributed controller 10002-1 includes a CCA circuitry (CCA step) 10002a-1, a backoff circuitry (backoff step) 10002b-1, and a transmission determination circuitry (transmission determination step) 10002c-1.

The CCA circuitry 10002a-1 can use either of or both of information about reception signal power received via radio resources and information about the reception signal (including information after decoding), the notification of which are provided from the receiver, to determine a state of the radio resources (including determining whether the state is busy or idle). The CCA circuitry 10002a-1 can notify the backoff circuitry 10002b-1 and the transmission determination circuitry 10002c-1 of the state determination information of the radio resources.

The backoff circuitry 10002b-1 can perform backoff using the state determination information of the radio resources. The backoff circuitry 10002b-1 has a function of generating a CW and counting down the CW. For example, the count-down of the CW is performed in a case that the state determination information of the radio resources indicates idle, and the count-down of the CW can be stopped in a case that the state determination information of the radio resources indicates busy. The backoff circuitry 10002b-1 can notify the transmission determination circuitry 10002c-1 of the value of the CW.

The transmission determination circuitry 10002c-1 performs transmission determination using either of or both the state determination information of the radio resources or/and the value of the CW. For example, the notification of transmission determination information can be provided to the transmitter 10003-1 in a case that the state determination information of the radio resources indicates idle and the value of the CW is zero. The notification of the transmission determination information can be provided to the transmitter 10003-1 in a case that the state determination information of the radio resources indicates idle.

The transmitter 10003-1 includes a physical layer frame generator (physical layer frame generation step) 10003a-1 and a radio transmitter (radio transmission step) 10003b-1. The physical layer frame generator 10003a-1 has a function of generating a physical layer frame (PPDU) based on the transmission determination information, the notification of which is provided from the transmission determination circuitry 10002c-1. The physical layer frame generator 10003a-1 performs error correction coding, modulation, precoding filter multiplication, and the like on transmission frames sent from the higher layer. The physical layer frame generator 10003a-1 notifies the radio transmitter 10003b-1 of the generated physical layer frame.

Figure 8:
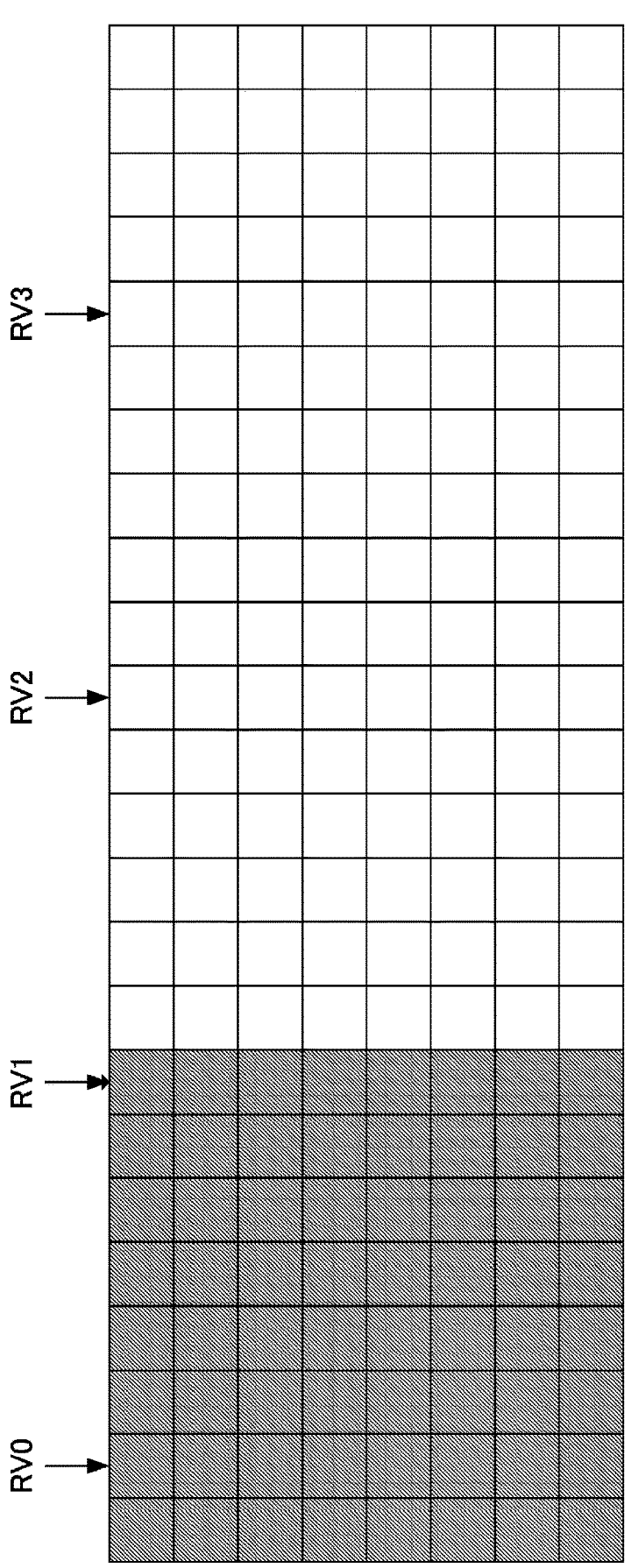
FIG. 8 is a schematic diagram illustrating an example of a coding scheme according to an aspect of the present invention.

FIG. 8 is a diagram illustrating an example of error correction coding of the physical frame generator according to the present embodiment. An information bit (systematic bit) sequence is mapped to the hatching region and a redundancy (parity) bit sequence is mapped to the white region as illustrated in FIG. 8. Bit interleaving is appropriately applied to each of the information bits and the redundancy bits. The physical frame generator can read a necessary number of bits as a starting position determined for the mapped bit sequence in accordance with a value of redundancy version (RV). Flexible change in coding rate, that is puncturing, is possible by adjusting the number of bits. Note that, although a total of four RVs are illustrated in FIG. 8, the number of options for RV is not limited to a specific value in the error correction coding according to the present embodiment. Station apparatuses need to share positions of RVs.

Although the physical layer frame generator performs error correction coding on the information bits transferred from the MAC layer, a circuitry in which the error correction coding (coding block length) is performed is not limited. For example, the physical layer frame generator can divide the information bit sequence transferred from the MAC layer into information bit sequences having a prescribed length to perform error correction coding on each of the sequences, and thus can make the sequences into multiple coding blocks. Note that dummy bits can be inserted into the information bit sequence transferred from the MAC layer in a case that coding blocks are configured.

The frame generated by the physical layer frame generator 10003a-1 includes control information. The control information includes information indicating to which RU the data addressed to each radio communication apparatus is mapped (here, the RU including both frequency resources and spatial resources). The frame generated by the physical layer frame generator 10003a-1 includes a trigger frame for indicating, to the radio communication apparatus that is a destination terminal, frame transmission. The trigger frame includes information indicating the RU to be used by the radio communication apparatus that has received the indication for the frame transmission to transmit the frame.

The radio transmitter 10003b-1 converts the physical layer frame generated by the physical layer frame generator 10003a-1 into a signal in a radio frequency (RF) band to generate a radio frequency signal. Processing performed by the radio transmitter 10003b-1 includes digital-to-analog conversion, filtering, frequency conversion from a baseband to an RF band, and the like.

The receiver 10004-1 includes a radio receiver (radio reception step) 10004a-1 and a signal demodulator (signal demodulation step) 10004b-1. The receiver 10004-1 generates information about reception signal power from a signal in the RF band received by the antenna unit 10005-1. The receiver 10004-1 can notify the CCA circuitry 10002a-1 of the information about the reception signal power and the information about the reception signal.

The radio receiver 10004a-1 has a function of converting a signal in the RF band received by the antenna unit 10005-1 into a baseband signal and generating a physical layer signal (e.g., a physical layer frame). Processing performed by the radio receiver 10004a-1 includes frequency conversion processing from the RF band to the baseband, filtering, and analog-to-digital conversion.

The signal demodulator 10004b-1 has a function of demodulating a physical layer signal generated by the radio receiver 10004a-1. Processing performed by the signal demodulator 10004b-1 includes channel equalization, demapping, error correction decoding, and the like. The signal demodulator 10004b-1 can extract, from the physical layer signal, information included in the physical layer header, information included in the MAC header, and information included in the transmission frame, for example. The signal demodulator 10004b-1 can notify the higher layer circuitry 10001-1 of the extracted information. Note that the signal demodulator 10004b-1 can extract any one or all of the information included in the physical layer header, the information included in the MAC header, and the information included in the transmission frame.

The antenna unit 10005-1 has a function of transmitting a radio frequency signal generated by the radio transmitter 10003b-1 into the radio space toward another radio apparatus. The antenna unit 10005-1 has a function of receiving a radio frequency signal transmitted by the radio apparatus 0-1.

The radio communication apparatus 10000-1 can describe, in the PHY header or the MAC header of the frame to be transmitted, information indicating a period in which the radio communication apparatus 10000-1 uses the radio medium, to cause a radio communication apparatus around the radio communication apparatus 10000-1 to configure a NAV for the period. For example, the radio communication apparatus 10000-1 can describe the information indicating the period in the Duration/ID field or a Length field of the frame to be transmitted. The NAV period configured for the radio communication apparatuses around the radio communication apparatus 10000-1 is referred to as a TXOP period (or simply TXOP) acquired by the radio communication apparatus 10000-1. The radio communication apparatus 10000-1 that has acquired the TXOP is referred to as a TXOP holder. The type of frame to be transmitted by the radio communication apparatus 10000-1 to acquire TXOP is not limited to any frame type, and the frame may be a control frame (e.g., an RTS frame or a CTS-to-self frame) or may be a data frame.

The radio communication apparatus 10000-1 that is a TXOP holder can transmit the frame to a radio communication apparatus other than the radio communication apparatus 10000-1 itself during the TXOP. In a case that the radio communication apparatus 1-1 is a TXOP holder, the radio communication apparatus 1-1 can transmit a frame to the radio communication apparatus 2A during the TXOP period. The radio communication apparatus 1-1 can indicate, to the radio communication apparatus 2A, a frame transmission addressed to the radio communication apparatus 1-1 during the TXOP period. The radio communication apparatus 1-1 can transmit, to the radio communication apparatus 2A, a trigger frame including information for indicating a frame transmission addressed to the radio communication apparatus 1-1 during the TXOP period.

The radio communication apparatus 1-1 may acquire a TXOP for the entire communication band (e.g., operation bandwidth) in which frame transmission is likely to be performed, or may acquire a TXOP for a specific communication band (Band) such as a communication band in which frames are actually transmitted (e.g., transmission bandwidth).

The radio communication apparatus, to which the radio communication apparatus 1-1 indicates a frame transmission in the TXOP period acquired by the radio communication apparatus 1-1, is not necessarily limited to a radio communication apparatus connected to the radio communication apparatus 1-1. For example, the radio communication apparatus can indicate, to radio communication apparatuses that are not connected to the radio communication apparatus itself, a frame transmission in order to cause a radio communication apparatus around the radio communication apparatus itself to transmit a management frame such as a Reassociation frame or a control frame such as an RTS/CTS frame.

Furthermore, TXOP in EDCA that is a data transmission method different from DCF will also be described. The IEEE 802.11e standard relates to the EDCA, and defines the TXOP from the perspective of QoS (Quality of Service) assurance for various services such as video transmission or VoIP. The services are roughly classified into four access categories, namely VOice (VO), VIdeo (VI), Best Effort (BE), and BacK ground (BK). In general, the services include VO, VI, BE, and BK, starting with the highest priority in this order. Each of the access categories has parameters including CWmin as a minimum value of CW, CWmax as a maximum value, AIFS (Arbitration IFS) as a type of IFS, and TXOP limit as an upper limit value of the transmission occasion, which are configured to give a difference in the priority. For example, it is possible to perform data transmission prioritized over the other access categories by setting CWmin, CWmax, and AIFS of VO with the highest priority for the purpose of voice transmission equal to a relatively small value as compared with the other access categories. For example, for the VI, where the amount of transmission data is relatively large due to video transmission, the TXOP limit can be configured to be larger, so that the transmission occasion can be longer than the other access categories. In this manner, four parameter values of each of the access categories are adjusted for the purpose of QoS assurance in accordance with various services.

In the present embodiment, the signal demodulator of the station apparatus can perform a decoding processing for the received signal in the physical layer, and perform error detection.

Here, the decoding processing includes decoding of error correction codes applied to the received signal. Here, the error detection includes error detection using an error detection code (e.g., a cyclic redundancy check (CRC) code) that has been given to the received signal in advance, and error detection using an error correction code (e.g., low-density parity-check code (LDPC)) having an error detection function from the first. The decoding processing in the physical layer can be applied for each coding block.

The higher layer circuitry transfers the result of decoding of the physical layer by the signal demodulator to the MAC layer. In the MAC layer, the signal of the MAC layer is restored from the transferred decoding result of the physical layer. Then, error detection is performed in the MAC layer, and it is determined that whether the signal of the MAC layer transmitted by the station apparatus as a transmission source of the reception frame has been properly restored.

An example of an embodiment in a radio network illustrated in FIG. 5 will be described below. In the present embodiment, the base station apparatus 1-1 uses multiple radio channels. A band of each radio channel to be used is not limited, and, for example, eight radio channels of 20 MHz band may be used, or four radio channels of 80 MHz band may be used. Further, the radio channel to be used is not limited to one system band, and multiple system bands may be used. For example, four radio channels of 20 MHz band may be used in the system band of 5.15 GHz band and four radio channels of 20 MHz band may be used in the system band of 5.25 GHz band, or two radio channels of 80 MHz band may be used in the system band of 5.15 to 5.25 GHz band and two radio channels of 80 MHz band may be used in the system band of 6 GHz band. The bands of the radio channels to be used need not be uniform, and the bands of the six radio channels may be set as 40, 40, 20, 20, 20 and 20 MHz bands. The base station apparatus 1-1 configures one or more radio channels as the primary channels in the system band to be used. As an example, the lower 20 MHz band in the system band to be used may be configured as the primary channel. In a case that multiple system bands are used, the primary channel may be configured for each system band. In a case that the primary channel is configured as 20 MHz, a radio channel for data communication may be connected to a radio channel of an adjacent 20 MHz band to form a 40 MHz band or a greater band. Hereinafter, a description is given on the assumption that four radio channels, radio channels 1 to 4 of 20 MHz are used in the present embodiment.

The base station apparatus 1-1 configures one or more radio channels among the multiple radio channels to be used for low-latency communication. As an example, in the present embodiment, the radio channel 4 is configured for low-latency communication. The base station apparatus 1-1 transmits a beacon including an information element indicating a radio channel used for low-latency communication, that is, the radio channel 4 used for low-latency communication in the present embodiment, through the multiple radio channels to be used. At this time, the same beacon as that transmitted on the primary channel may be transmitted on one or more radio channels other than the primary channel. In the present embodiment, the beacon including the information element indicating that the radio channel 4 is for low-latency communication is transmitted to the radio channels 1 to 4. In a case that it is determined that the low-latency communication cannot be performed for some reason, for example, a case that a usage rate of the radio channel configured for low-latency communication exceeds a certain threshold or a case that a signal of a level at which interference is received from a channel adjacent to the radio channel configured for low-latency communication is detected in the adjacent channel, the base station apparatus 1-1 may transmit a beacon including an information element indicating that the low-latency communication cannot be performed or an information element indicating that the low-latency communication cannot be performed temporarily.

Note that, in the present embodiment, the description is given for the low-latency communication, but embodiments are not limited to usage of the low-latency communication. For example, the communication for low-latency communication described in the present embodiment may be used to increase reliability, or may be applied to communication for connecting a large number of terminals, large-capacity communication, or the like. The low-latency communication may be referred to as a low-latency communication method or a method (communication method) for reducing latency, to be distinguished from a communication method using the DCF.

In the present embodiment, it is assumed that the terminal apparatus 2-1 performs low-latency communication. The terminal apparatus 2-1, after receiving the beacon including the information element indicating the radio channel used for low-latency communication, transmits a request for starting low-latency communication to the base station apparatus 1-1. At this time, the request for starting low-latency communication may be made specifying the radio channel 4 included in the beacon. In a case that capability information received from the base station apparatus 1-1 at the time of initial connection (at the time of association) includes an information element indicating that the base station apparatus 1-1 supports the low latency information, the terminal apparatus 2-1 may transmit the request for starting low-latency communication to the base station apparatus 1-1 based on the information element. At this time, the request for starting low-latency communication may be transmitted without specifying the radio channel to be used, or the terminal apparatus 2-1 may transmit the request for starting low-latency communication specifying an arbitrary radio channel, for example, a radio channel the lowest in the usage rate among the radio channels that can be used by the terminal apparatus 2-1. The terminal apparatus 2-1 may include information indicating a requested latency in the request for starting low-latency communication to be transmitted to the base station apparatus 1-1. A format of the information indicating the latency is not limited, and may be, for example, a numerical value in milliseconds, or may be numerical information corresponding to a class obtained by classifying the requested latency. The terminal apparatus 2-1 may include information indicating how frequently the low-latency communication is to be performed in the request for starting low-latency communication to be transmitted to the base station apparatus 1-1. A format of the information indicating how frequently the low-latency communication is to be performed is not limited, and may be, for example, a numerical value in milliseconds, or may be numerical information corresponding to a class obtained by classifying how frequently performed the low-latency communication.

The base station apparatus 1-1, after receiving the request for starting low-latency communication from the terminal apparatus 2-1, transmits a response for starting low-latency communication to the terminal apparatus 2-1. At this time, an information element indicating a radio channel for performing low-latency communication, that is, the radio channel 4 used for low-latency communication in the present embodiment, may be included and transmitted. Prior to this, for example, capability information or the like to be transmitted by the terminal apparatus 2-1 at the time of initial connection may include an information element indicating that the terminal apparatus 2-1 supports the low-latency communication. The base station apparatus 1-1 may transmit the response for starting low-latency communication, based on the information indicating that the low-latency communication is supported, the information being included in the priorly received capability information transmitted from the terminal apparatus 2-1. In a case that the base station apparatus 1-1 receives, from the terminal apparatus 2-1, a request for starting low-latency communication specifying a radio channel for low-latency communication that is other than the radio channel 4 configured for low-latency communication, the base station apparatus 1-1 may transmit a response for starting low-latency communication specifying the radio channel 4 the base station apparatus configures for low-latency communication. In a case that the radio channel included in the request for starting low-latency communication transmitted from the terminal apparatus 2-1 is different from the radio channel for low-latency communication configured by the base station apparatus, the base station apparatus 1-1 may configure the radio channel indicated by the terminal apparatus as the radio channel for low-latency communication. The base station apparatus 1-1, in a case of changing the configuration of the radio channel for low-latency communication, may include an information element indicating the changed radio channel for low-latency communication in the response for starting low-latency communication with respect to the terminal apparatus 2-1.

The base station apparatus 1-1, in the case of changing the radio channel for low-latency communication, may make no change to the radio channel for low-latency communication, based on a state of the radio channel to be changed, for example, information on whether the usage rate of the channel exceeds a prescribed value, whether communication of another BSS is being performed, whether an intensity of radio waves coming from the terminal apparatus performing low-latency communication is lower than a prescribed value, or the like. The base station apparatus 1-1, in the case of changing the radio channel for low-latency communication and that there is a terminal apparatus already performing low-latency communication, may notify the terminal already performing low-latency communication that the radio channel for low-latency communication is to be changed and then change the radio channel for low-latency communication. The base station apparatus 1-1, in the case of changing the radio channel for low-latency communication, may, prior to the change, transmit information including an information element indicating that the radio channel for low-latency communication is to be changed by using broadcast communication such as a beacon or using individually unicast communication with respect to the terminal apparatus. After changing the radio channel for low-latency communication, the base station apparatus 1-1 may transmit information including an information element indicating the changed radio channel for low-latency communication by using broadcast communication such as a beacon or using individually unicast communication with respect to the terminal apparatus. The base station apparatus 1-1 may configure a minimum period during which the radio channel allocated for low-latency communication is changed and transmit a beacon including information indicating the minimum period.

The base station apparatus 1-1, after transmitting the response for starting low-latency communication to the terminal apparatus 2-1, performs transmission for causing the terminal apparatus 2-1 to perform low-latency communication transmission by using the radio channel for performing low-latency communication. Various methods can be used for the transmission for causing the terminal apparatus to perform low latency. For example, transmission of a trigger frame, transmission of a CTS frame, transmission of a CF-POLL, and the like can be used, and in the present embodiment, an example in which a trigger frame is used will be mainly described. The base station apparatus 1-1 periodically transmits a trigger frame to the terminal apparatus 2-1. Prior to the transmission of the trigger frame, the base station apparatus 1-1 may perform carrier sense in the radio channel for performing low-latency communication. As a result of the carrier sense, in a case that it is determined that the radio channel for performing low-latency communication is busy, the base station apparatus 1-1 may stop or postpone the transmission of the trigger frame. A threshold used for the carrier sense may be the same as or different from a threshold used for performing carrier sense in the radio channel on which low-latency communication is not performed. With a threshold for the carrier sense small, the terminal apparatus performs low-latency communication on a radio channel in a cleaner state. With a threshold for the carrier sense large, low-latency communication can be started even in a certain level of noise environment in which a weak interference signal arrives from an adjacent BSS or the like. A transmission period of the trigger frame may be configured based on the information of the latency or the information of the periodicity transmitted from the terminal apparatus 2-1. For example, in a case that the latency is specified, the trigger frame may be transmitted at a periodicity of a prescribed multiple of the specified latency. For example, in a case that 1 millisecond is specified as the latency, the trigger frame may be transmitted every 2 milliseconds that is twice the specified latency. This multiple does not need to be fixed, and may be changed based on other factors, for example, the number of terminal apparatuses that simultaneously perform low-latency communication, or other information such as information indicating how frequently the low-latency communication indicated from the terminal apparatus is to be performed. In a case that the information of a periodicity of low-latency communication is indicated from the terminal apparatus 2-1, a transmission frequency of how often the trigger frame is to be transmitted may be configured based on the information of the periodicity. As an example, in a case that 10 milliseconds, that is a prescribed multiple of the frequency of how often the low-latency communication is performed, is configured, the transmission frequency may be configured to be every 5 milliseconds, that is one-half times the configured 10 milliseconds. The transmission frequency of how often the trigger frame is to be transmitted may not consist of one interval. For example, in a case that a latency of 1 millisecond and a periodicity of 10 milliseconds are specified from the terminal apparatus 2-1, the transmission intervals of the trigger frame may be configured as 1 millisecond, 9 milliseconds, 1 millisecond, 9 milliseconds, . . . (hereinafter, repeated) to provide multiple transmission occasions in the period.

The base station apparatus 1-1 may include information indicating that a trigger frame to be transmitted is a trigger frame for low-latency communication in the trigger frame to be transmitted. The base station apparatus 1-1 may include information indicating that a trigger frame to be transmitted is addressed to the terminal apparatus 2-1 in the trigger frame to be transmitted. The base station apparatus 1-1 may include information specifying a radio resource to be used by the terminal apparatus 2-1 for low-latency communication in the trigger frame. At this time, information may be included indicating that, as the resource to be used, the entire radio channel is used or a resource unit of a part of the radio channel is specified. The base station apparatus 1-1 may include information indicating a time used for low-latency communication in the trigger frame to be transmitted.

The terminal apparatus 2-1, after receiving the response for starting low-latency communication from the base station apparatus 1-1, waits for the trigger frame to be transmitted from the base station apparatus 1-1. After receiving the trigger frame, the terminal apparatus 2-1 checks whether the trigger frame includes the information addressed to the terminal apparatus 2-1. In a case that the trigger frame includes the information addressed to the terminal apparatus 2-1, the terminal apparatus 2-1 transmits data for low-latency communication. In a case that the received trigger frame includes the information addressed to the terminal apparatus 2-1 and the received trigger frame further includes the information indicating that the received trigger frame is for low-latency communication, the terminal apparatus 2-1 may transmit data for low-latency communication. In a case that the received trigger frame includes the information specifying a radio resource to be used for low-latency communication, the terminal apparatus 2-1 may transmit the data for low-latency communication by using the specified radio resource, for example, the specified resource unit.

After a prescribed time elapses after the terminal apparatus 2-1 receives the trigger frame for low-latency communication addressed to the terminal apparatus 2-1 from the base station apparatus 1-1, the terminal apparatus 2-1 transmits the data for low-latency communication. In the present embodiment, the transmission is performed after a Short InterFrame Space (SIFS) used in communication other than low-latency communication, but embodiments are not limited to this. As an example, at the time of low-latency communication, the terminal apparatus 2-1 may be configured to perform the transmission in a time shorter than the SIFS in order to reduce the latency after receiving the trigger frame.

In a case that the terminal apparatus 2-1 receives the trigger frame for low-latency communication addressed to the terminal apparatus 2-1 from the base station apparatus 1-1 and that there is no data for low-latency communication to be transmitted, the terminal apparatus 2-1 need not transmit data. Alternatively, in the case that the terminal apparatus 2-1 receives the trigger frame for low-latency communication addressed to the terminal apparatus 2-1 from the base station apparatus 1-1 and that there is no data for low-latency communication to be transmitted, the terminal apparatus 2-1 may transmit only a confirmation packet (ACK packet) or may transmit a packet including dummy data. In a case that the trigger frame for low-latency communication addressed to the terminal apparatus 2-1 received from the base station apparatus 1-1 includes the information indicating a time to be used for low-latency communication, the terminal apparatus 2-1 may transmit to the base station apparatus 1-1 data including dummy data for setting a transmission time to a time equivalent to the indicated time.

The base station apparatus 1-1, after transmitting the response for starting low-latency communication to the terminal apparatus, may transmit information indicating that the terminal apparatus has started low-latency communication on the radio channel for low-latency transmission in the information transmitted in the beacon. This information may include information such as the number of terminals performing low-latency communication, the frequency of how often the low-latency communication is to be performed, and the latency of low-latency communication.

The terminal apparatus 2-1, in a case of stopping low-latency communication, transmits a request for stopping low-latency communication to the base station apparatus 1-1. The request may be transmitted using a radio channel for performing low-latency communication or the primary channel. The base station apparatus 1-1, in a case of receiving the request for stopping low-latency communication from the terminal apparatus 2-1, transmits a response for stopping low-latency communication to the terminal apparatus 2-1. After that, the base station apparatus 1-1 may stop the transmission of the trigger frame for low-latency communication. In a case that there is a terminal apparatus performing low-latency communication other than the terminal apparatus 2-1, the base station apparatus 1-1 need not stop the transmission of the trigger frame for low-latency communication.

Figure 12:
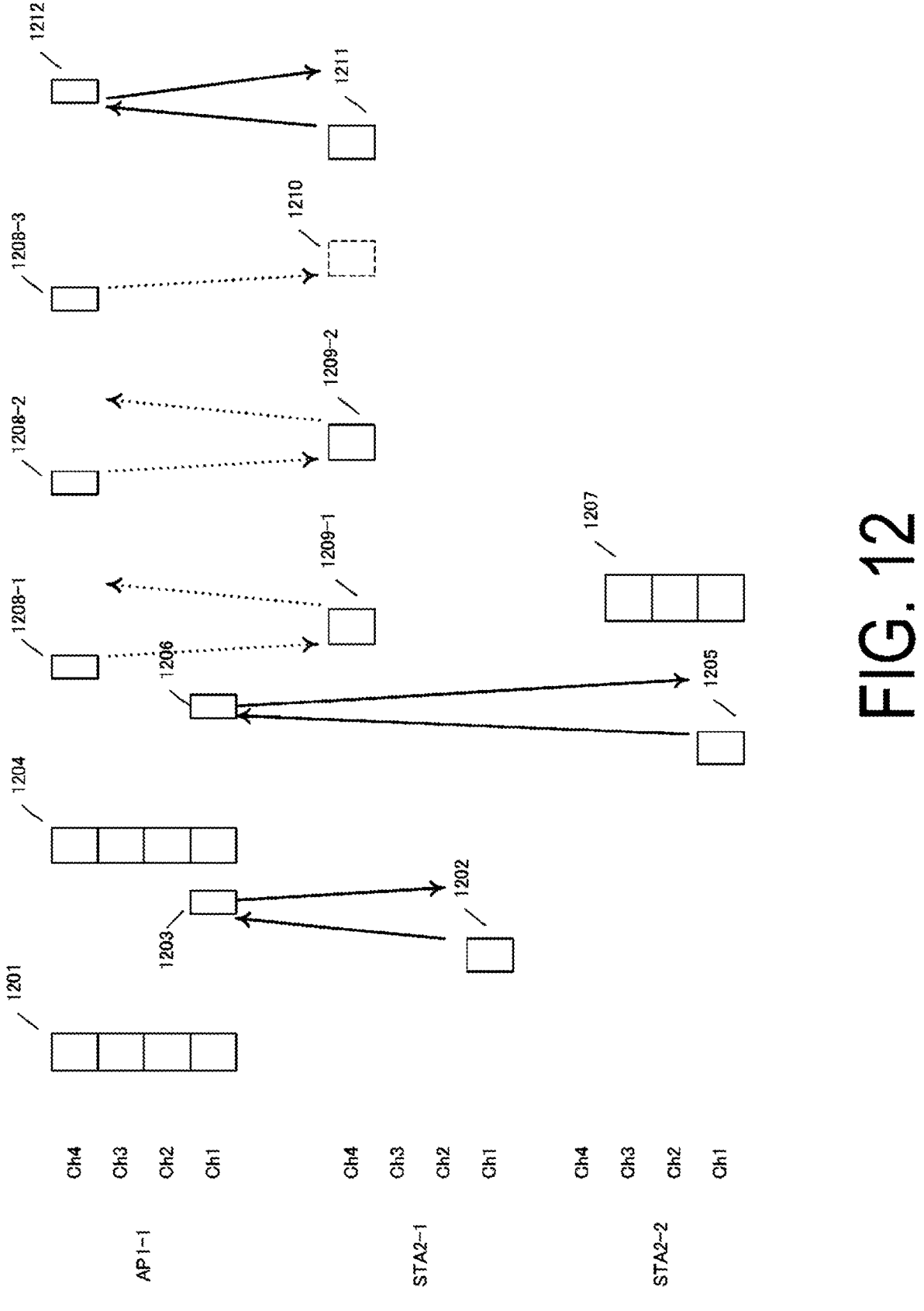
FIG. 12 is a diagram illustrating a flow according to an aspect of the present invention.

An example of the contents described above will be described with reference to FIG. 12. First, the base station apparatus 1-1 transmits a beacon 1201 including information of a radio channel for low-latency communication to multiple radio channels to be used for communication, i.e., the radio channels 1 to 4. The terminal apparatus 2-1 receiving the beacon transmits a request 1202 for starting low-latency communication to the base station apparatus 1-1 by using the radio channel 1 that is the primary channel. The base station apparatus 1-1 receiving the request 1202 for starting low-latency communication transmits a response 1203 for starting low-latency communication to the terminal apparatus 2-1 by using the primary channel. After that, the base station apparatus 1-1 transmits a beacon 1204 including the information for starting low-latency communication on the radio channel 4 to the multiple radio channels to be used for the communication to be used, i.e., the radio channels 1 to 4. The terminal apparatus 2-2 receiving the beacon transmits a request 1205 indicating that subsequent communication is to be performed on the radio channels 1 to 3 to the base station apparatus 1-1 by using the primary channel. The base station apparatus 1-1 receiving the request transmits a response 1206 indicating that the terminal apparatus 2-2 performs subsequent communication on the radio channels 1 to 3 to the terminal apparatus 2-2. The terminal apparatus

2-2 receiving the response performs subsequent communication 1207 by using the radio channels 1 to 3. The base station apparatus 1-1 periodically transmits trigger frames 1208-1 to 1208-3 for causing the terminal apparatus 2-1 to perform low-latency transmission to the terminal apparatus 2-1. The terminal apparatus 2-1, after receiving the trigger frames 1208-1 and 1208-2, transmits data 1209-1 and 1209-2 for low-latency communication. In a case that there is no data for low-latency communication to be transmitted after the trigger frame 1208-3 is received, transmission 1210 including dummy data may be performed. The terminal apparatus 2-1 transmits a request 1211 for stopping low-latency communication to the base station apparatus 1-1 in order to stop the low-latency transmission. The base station apparatus 1-1 receiving the request 1211 for stopping low-latency communication transmits a response 1212 for stopping low-latency communication to the terminal apparatus 2-1 and then stops the transmission of the trigger frame for starting low-latency communication. In the figure, a solid line arrow indicates a communication flow according to the DCF method, and a dotted line arrow indicates a flow of a trigger frame for low-latency communication and transmission data for low-latency communication. Although the description describes the terminal apparatus 2-2 as an example of a radio communication apparatus that does not perform transmission of a radio channel for low-latency communication, such a radio communication apparatus is not limited to the terminal apparatus, and the similar operation may be performed by another base station apparatus in the same BSS. The terminal apparatus 2-2 may use the radio channel for low-latency communication in a case that the terminal apparatus 2-2 knows that the radio channel for low-latency communication is not used through a beacon or the like. At this time, the use of the radio channel for low-latency communication may be transmitted to the base station apparatus 1-1.

With an operation as described above, the base station apparatus 1-1 can notify other base station apparatuses and terminal apparatuses that low-latency communication is performed on a part of the multiple radio channels to be used for communication by transmitting a beacon or a trigger frame. This allows the radio channels to be less frequently used by other base station apparatuses and terminal apparatuses for low-latency communication, thus improving the quality of low-latency communication.

Next, a modification will be described in which a base station apparatus or a terminal apparatus in a neighboring BSS recognizes a radio channel to be used for low-latency communication to reduce the frequency of how often the radio channel is to be used for low-latency communication. As an example, it is assumed that the base station apparatus 1-2 can use the same radio channel as the base station apparatus 1-1. The base station apparatus 1-2 receives the beacon or the trigger frame transmitted by the base station apparatus 1-1 on any one of the radio channels to be used, and checks whether the received beacon or the received trigger frame includes the information of the radio channel for low-latency communication or the information of the radio channel on which low-latency communication is started. In a case that the received beacon or the received trigger frame includes the information of the radio channel for low-latency communication or the information of the radio channel on which low-latency communication is started, the base station apparatus 1-2 may cause the radio channel for low-latency communication or the radio channel on which low-latency communication is started to be less frequently used, or stop the transmission using the radio channel, regarding data to be transmitted by the base station apparatus 1-2. The base station apparatus 1-2 may transmit a beacon including an information element indicating the radio channel for low-latency communication or the radio channel on which low-latency communication is performed in the neighboring BSS.

The terminal apparatuses 2-4, 2-5, and 2-6 communicating with the base station apparatus 1-2 can recognize the radio channel for low-latency communication or the radio channel on which low-latency communication is performed in the neighboring BSS through the beacon transmitted from the base station apparatus 1-2. This allows the terminal apparatuses 2-4, 2-5, and 2-6 to cause the radio channel for low-latency communication or the radio channel on which low-latency communication is performed in the neighboring BSS to be less frequently used, or to stop the transmission. With operation as described above, the base station apparatus or the terminal apparatus in the neighboring BSS can recognize the radio channel to be used for low-latency communication to allow the radio channel to be less frequently used for low-latency communication.

Figure 13:
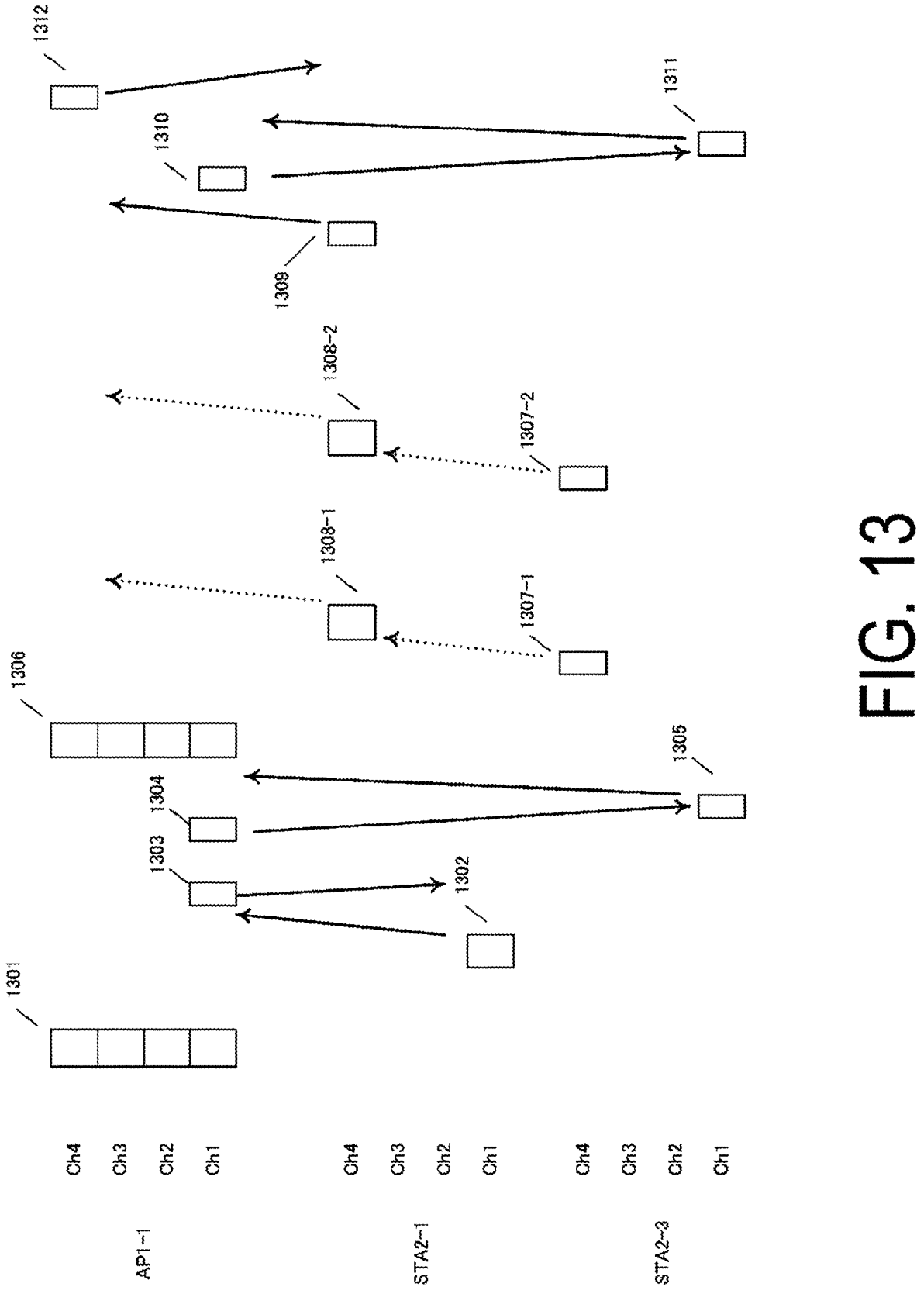
FIG. 13 is a diagram illustrating a flow according to an aspect of the present invention.

Next, a modification will be described in which the base station apparatus 1-1 causes another terminal apparatus to transmit a trigger frame for low-latency communication. The modification is aimed to mitigate deterioration of reception performance on a radio channel other than a radio channel transmitting a trigger frame, due to interference caused by transmission of the trigger frame, in a case that the trigger frame is transmitted very frequently on a part of radio channels among multiple radio channels used by a base station apparatus. FIG. 13 illustrates an example of a flow in which the base station apparatus 1-1 controls the terminal apparatus 2-3 to transmit a trigger frame in order to cause the terminal apparatus 2-1 to start low-latency communication.

The base station apparatus 1-1 transmits a beacon 1301 including information of radio channels to be used, the radio channels 1 to 4 for low-latency communication. The beacon 1301 may include information of the terminal apparatus 2-3 that transmits the trigger frame. The terminal apparatus 2-1 receiving the beacon 1301 transmits a request 1302 for starting low-latency communication to the base station apparatus 1-1. The base station apparatus 1-1 receiving the request 1302 for starting low-latency communication transmits a response 1303 for starting low-latency communication to the terminal apparatus 2-1. After that, the base station apparatus 1-1 transmits, to the terminal apparatus 2-3, a request 1304 that the terminal apparatus 2-3 transmit a trigger frame to the terminal apparatus 2-1. The request 1304 for transmitting a trigger frame may include information of a periodicity for transmitting the trigger frame, an interval (period) acquired for low-latency communication, a radio channel for performing low-latency communication, and a frequency (resource unit) of a part of radio channels for performing low-latency communication. The terminal apparatus 2-3 receiving the request 1304 for transmitting a trigger frame transmits a response 1305 for transmitting a trigger frame to the base station apparatus 1-1. The base station apparatus 1-1 receiving the response 1305 for transmitting a trigger frame transmits a beacon 1306 including information indicating that low-latency communication is to be started on the radio channel 4. The terminal apparatus 2-3 transmitting the response 1305 for transmitting a trigger frame periodically transmits trigger frames 1307-1 and 1307-2 for causing the terminal apparatus 2-1 to perform low-latency communication on the radio channel 4. The terminal apparatus 2-1 receiving the trigger frames 1307-1 and 1307-2 transmits data 1308-1 and 1308-2 for low-latency communication to the base station apparatus 1-1. The terminal apparatus 2-1 transmits a request 1309 for stopping low-latency communication to the base station apparatus 1-1 in a case of stopping the low-latency communication. The base station apparatus 1-1 receiving the request 1309 for stopping low-latency communication transmits a request 1310 for stopping low-latency communication to the terminal apparatus 2-3. The terminal apparatus 2-3 receiving the request 1310 for stopping low-latency communication transmits a response 1311 for stopping low-latency communication to the base station apparatus 1-1 and stops the transmission of subsequent trigger frames. The base station apparatus 1-1 receiving the response 1311 for stopping low-latency communication transmits a response 1312 for stopping low-latency communication to the terminal apparatus 2-1. With operation as described above, it is possible for a radio channel other than a radio channel transmitting a trigger frame to reduce interference caused by transmission of the trigger frame, in a case that the trigger frame is transmitted very frequently on a part of radio channels among multiple radio channels used by a base station apparatus.

2. Matters Common for all Embodiments

Although the communication apparatuses according to the present invention can perform communication in a frequency band (frequency spectrum) that is a so-called unlicensed band that does not require permission to use from a country or a region, frequency bands usable are not limited thereto. The communication apparatus according to the present invention can exhibit its effect also in a frequency band called a white band, which is actually not used for the purpose of preventing frequency jamming and the like even though permission to use the frequency band is given from a country or a region for a specific service (for example, a frequency band allocated for television broadcasting but is not used depending on regions), or in a shared spectrum (shared frequency band) which is expected to be shared by multiple service providers, for example.

A program that operates in the radio communication apparatus according to the present invention is a program (a program for causing a computer to function) for controlling the CPU or the like to implement the functions of the aforementioned embodiments related to the present invention. In addition, information handled by these apparatuses is temporarily accumulated in a RAM at the time of processing, is then stored in various types of ROMs and HDDs, and is read by the CPU as necessary to be corrected and written. A semiconductor medium (e.g., a ROM, a nonvolatile memory card, etc.), an optical recording medium (e.g., a DVD, an MO, an MD, a CD, a BD, etc.), a magnetic recording medium (e.g., a magnetic tape, a flexible disk, etc.), and the like can be examples of recording media for storing programs. In addition to implementing the functions of the aforementioned embodiments by performing loaded programs, the functions of the present invention may be implemented in processing performed in cooperation of an operating system, other application programs, and the like based on instructions of those programs.

In a case of delivering these programs to market, the programs can be stored and distributed in a portable recording medium, or transferred to a server computer connected via a network such as the Internet. In this case, the storage device serving as the server computer is also included in the present invention. A part or an entirety of the communication apparatuses in the aforementioned embodiments may be implemented as an LSI that is typically an integrated circuit. The functional blocks of the communication apparatuses may be individually implemented as chips or may be partially or completely integrated into a chip. In a case that the functional blocks are made as integrated circuits, an integrated circuit controller for controlling them is added.

The circuit integration technique is not limited to LSI, and may be realized as dedicated circuits or a multi-purpose processor. Moreover, in a case that a circuit integration technology that substitutes an LSI appears with the advance of the semiconductor technology, it is also possible to use an integrated circuit based on the technology.

Note that, the invention of the present application is not limited to the above-described embodiments. The radio communication apparatus according to the invention of the present application is not limited to the application in the mobile station apparatus, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

Although the embodiments of the invention have been described in detail above with reference to the drawings, a specific configuration is not limited to the embodiments, and designs and the like that do not depart from the essential spirit of the invention also fall within the claims.

INDUSTRIAL APPLICABILITY

The present invention can be preferably used in a communication apparatus and a communication method.

The invention claimed is:

1. A radio communication apparatus that simultaneously uses a plurality of radio channels, the radio communication apparatus comprising:
   a radio communicator; and
   a radio controller, wherein:
      the radio controller uses a plurality of transmission methods,
      at least one of the plurality of transmission methods is a method for reducing latency,
      at least one radio channel of the plurality of radio channels is used for the method for reducing latency,
      the radio communicator transmits a plurality of beacons on two or more of the plurality of radio channels, and information transmitted in one of the plurality of beacons includes an information element indicating the method for reducing latency.

2. The radio communication apparatus according to claim 1, wherein
   a trigger frame is transmitted on a radio channel, among the two or more of the plurality of radio channels, on which the information is transmitted, and
   the trigger frame includes information indicating that the transmission is to be performed by the method for reducing latency.

3. A radio communication method used in a radio communication apparatus that simultaneously uses a plurality of radio channels, the radio communication method comprising:
   using a plurality of transmission methods, at least one of the plurality of transmission methods being a method for reducing latency;
   using at least one radio channel of the plurality of radio channels for the method for reducing latency; and
   transmitting a plurality of beacons on two or more of the plurality of radio channels, wherein
   information transmitted in at least one of the plurality of beacons includes an information element indicating the method for reducing latency.

4. The radio communication apparatus according to claim 1, wherein
   the method for reducing latency is used on a radio channel, among the two or more of the plurality of radio channels, on which the information is transmitted.

5. A radio communication apparatus that simultaneously uses a plurality of radio channels, the radio communication apparatus comprising:
   a radio communicator; and
   a radio controller, wherein:
      the radio controller uses a plurality of transmission methods,
      at least one of the plurality of transmission methods is a method for reducing latency,
      the radio communicator receives a beacon on one radio channel of the plurality of radio channels,
      information transmitted in the beacon includes an information element indicating the method for reducing latency, and
      the method for reducing latency is used on the one radio channel.

* * * * *